(12) United States Patent
Kawaura et al.

(10) Patent No.: US 7,164,349 B2
(45) Date of Patent: Jan. 16, 2007

(54) APPROACHING OBJECT DETECTION APPARATUS

(75) Inventors: Masanori Kawaura, Nukata-gun (JP); Norio Sanma, Okazaki (JP); Tetsuya Takafuji, Anjo (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 188 days.

(21) Appl. No.: 10/969,854

(22) Filed: Oct. 22, 2004

(65) Prior Publication Data

US 2005/0099278 A1 May 12, 2005

(30) Foreign Application Priority Data

Nov. 7, 2003  (JP) .............................. 2003-378915
Nov. 7, 2003  (JP) .............................. 2003-378930

(51) Int. Cl.
*B60Q 1/00* (2006.01)

(52) U.S. Cl. ...................... 340/435; 340/436; 340/551; 327/207.26; 280/735

(58) Field of Classification Search ................ 340/435, 340/436, 667, 438, 545.1, 551; 280/735, 280/731; 324/207.26, 207.17, 207.16; 180/274
See application file for complete search history.

(56) References Cited

U.S. PATENT DOCUMENTS

| 5,402,098 | A | * | 3/1995 | Ohta et al. ................. 336/200 |
| 5,906,392 | A | * | 5/1999 | Reid et al. ................. 280/735 |
| 6,317,048 | B1 | * | 11/2001 | Bomya et al. .......... 340/573.1 |
| 6,561,301 | B1 | | 5/2003 | Hattori et al. |
| 6,586,926 | B1 | * | 7/2003 | Bomya ................. 324/207.17 |

FOREIGN PATENT DOCUMENTS

JP  A-2000-177514  6/2000
JP  A-2000-326808  11/2000

* cited by examiner

*Primary Examiner*—Anh V. La
(74) *Attorney, Agent, or Firm*—Oliff & Berridge, PLC

(57) ABSTRACT

A detection apparatus determines the type of an object approaching a vehicle. The detection apparatus is provided on a bumper of the vehicle, and comprises a coil as well as electrode lines to serve as the electrodes of a capacitor for detecting a human body. The detection apparatus is capable of differentiating a metallic body and a human body from each other based on variations in output voltage, which are caused by changes in their impedance.

39 Claims, 13 Drawing Sheets

| L[uH]  | 156.7 |
|--------|-------|
| C[pF]  | 99.7  |
| R[kΩ]  | 37.4  |
| Ro[kΩ] | 100   |

(fo=1.27MHz)

APPROACHING OBJECT DETECTION APPARATUS

CROSS REFERENCE TO RELATED APPLICATION

This application is based on and incorporates herein by reference Japanese Patent Applications No. 2003-378915 and No. 2003-378930, both being filed on Nov. 7, 2003.

FIELD OF THE INVENTION

The present invention relates to an apparatus for recognizing approach made by a body to a vehicle and type of the body in a non-contact way. More particularly, the present invention relates to an apparatus for detecting approach made by a pedestrian to a vehicle.

BACKGROUND OF THE INVENTION

A technology has been proposed for a pedestrian protection. It is determined whether or not a collision object with which a vehicle collided is a pedestrian, and an apparatus for protecting the pedestrian is activated when a collision victim is determined to be a pedestrian. In addition, a study to put the pedestrian protection technology to practical use is also being conducted. For this reason, another technology is also desired as a technology to determine whether or not a body to which a vehicle is approaching is a pedestrian. Such a technology is expected to be capable of detecting approach made by a vehicle to a vehicle made of metals prior to a collision in order to protect passengers of the vehicle.

As a conventional pedestrian recognition technology, an electrostatic capacitance method for detecting a body approached by a vehicle has been proposed in JP-A-2000-177514 (U.S. Pat. No. 6,561,301) and JP-A-2000-326808. The electrostatic capacitance method for detecting a body approached by a vehicle is a method for detecting approach to a body exhibiting conductivity. This electrostatic capacitance method electrically detects a difference in electrostatic capacitance to discriminate between a pedestrian as a collision object and a conductor also as a collision object based on a change in electrostatic capacitance between the conductor and an electrode plate of a sensor unit.

It is also conventional to radiate ultrasonic waves and receive reflected ultrasonic waves for detecting approach to an object against the vehicle in a non-contact way.

In accordance with the electrostatic capacitance method for detecting a body approached by a vehicle, however, the difference in electrostatic capacitance between a human body and a conductor is small. Further, the gradients of the sensor outputs for a human body and a conductor are similar. Thus, this electrostatic capacitance method cannot differentiate a human body and a conductor from each other for certain shapes and types of the metallic body. In addition, in order to amplify output changes accompanying changes in electrostatic capacitance, an operation at a high frequency is required. In consequence, effects of high-frequency noises superposed on the circuit output and effects of foreign noise electric waves increase, thus lowering precision of discrimination.

Furthermore, the ultrasonic wave method is difficult to provide an ultrasonic wave oscillation receiver around the whole vehicle from the standpoint of costs. Thus, the ultrasonic wave method has been put to practical use only in a limited way as a back sonar or the like. Moreover, the ultrasonic wave method cannot recognize the type of an approaching object.

SUMMARY OF THE INVENTION

It is thus an object of the present invention to provide a non-contact approaching object detection apparatus that can be put to practical use with ease even from the manufacturing cost point of view and is capable of well differentiating a metallic body and a pedestrian from each other.

In accordance with the present invention, a coil for generating an alternating current magnetic field around a vehicle is provided on the surface of the vehicle. From changes in coil alternating current impedance, an approaching object having conductivity is detected. The coil can be made flat with ease and provided on the front, rear and side faces of the vehicle easily. Thus, in comparison with the ultrasonic wave method, the present invention is capable of widely monitoring surroundings of the vehicle in a non-contact way at a much lower cost. In addition, this coil is capable of discriminating between a metallic body and a human body in comparison with the ultrasonic wave method and the electrostatic capacitance method.

Furthermore, when the alternating current magnetic field generated by the coil is applied to a metallic body, an eddy current flows through the metallic body, changing the impedance of the coil. When the alternating current magnetic field generated by the coil is applied to a human body, however, almost no eddy current flows through the pedestrian. Thus, the pedestrian and the metallic body can be well differentiated from each other.

It is to be noted that, by the metallic body mentioned in this description, a conductor having a specific resistance smaller than that of a human body is implied. The metallic body may be a magnetic material or a non-magnetic material. In addition, the electric quantity of the coil impedance attributed to an eddy current flowing through the approaching object can be measured by adopting a variety of methods. For example, an alternating current power is supplied to this coil from a constant voltage power supply by way of a load impedance device, and a voltage drop through the load impedance device or the coil is detected. As an alternative method, a resonance circuit including the coil impedance is put in a self-running oscillation state and the frequency of the oscillation is measured.

It is preferable to provide an electrostatic capacitance detection sensor at a location in close proximity to the coil. By having such a sensor unit close to the coil, a metallic body can be selectively detected based on changes in coil impedance, and a human body can also be selectively detected based on changes in electrostatic capacitance Co to the ground. In addition, it is also possible to well determine whether the approaching object is a metallic body or a pedestrian.

It is to be noted that a metallic body also changes the electrostatic capacitance exhibited by an electrode to the ground. Since a metallic body can be selectively detected based on changes in coil impedance, however, an electrostatic capacitance sensor recognizes approach to a pedestrian or approach to a metallic body. When the electrostatic capacitance sensor and another sensor detect an object, the detections indicate that the approach is approach being made by a metallic body. If only the electrostatic capacitance sensor detects an object, however, the detection indicates that the approach is approach being made by a pedestrian. Thus, a pedestrian and a metallic body can be differentiated from each other.

It is preferable to detect the electric quantity of the eddy current and the electric quantity of the electrostatic capacitance to the ground by using a single sensor unit so that the circuit configuration can be made simpler considerably. In particular, an output voltage drops when a pedestrian approaches the vehicle but goes up when a metallic body does. Thus, a sensor unit is capable of differentiating a pedestrian and a metallic body from each other with ease and high reliability.

In addition, a coil alternating current impedance decrease (or an increase in eddy current) caused by approach to a human body is substantially small in comparison with approach to a metallic body. Since the area of the surface of a human body is relatively large, however, the electrostatic capacitance to the ground increases due to approach to a human body. Since the increase in electrostatic capacitance Co typically lowers an electric potential appearing between the connection terminals of the coil and the capacitor to the ground, the approach to the human body can be detected.

It is to be noted that, when the metallic body has a surface area equivalent to that of a human body as seen from an electrode, the change of the to-the-ground electrostatic capacitance of the electrode is equal to the change for the human body. In the case of a metallic body, however, an effect of an electric potential increase appearing at the connection terminal due to a decrease in coil alternating current impedance (or a decrease in eddy current) overrides an effect of an electric potential decrease appearing at the connection terminal due to this electrostatic capacitance. Thus, the direction of the electric potential change appearing at the connection terminal for a human body is opposite to the direction of that for a metallic body. As a result, a metallic body and a human body can be differentiated from each other. That is, when the vehicle approaches a metallic body, the coil impedance decreases due to an eddy current at the same time as the electrostatic capacitance to the ground rises due to an increase in capacitance between the metallic body and the electrode as the approach is made to the metallic body.

In accordance with a result of an experiment, however, the decrease in coil impedance is greater than the increase in electrostatic capacitance to the ground. Thus, in the case of approach to a metallic body, an output voltage increase caused by the decrease in coil impedance overrides an output voltage decrease caused by the increase in electrostatic capacitance to the ground. As a result, when the vehicle approaches a metallic body, the output voltage increases.

It is preferable to provide a plurality of coils at least on the front or rear face of the vehicle, sequentially arranging them in the transversal direction of the vehicle. For each coil, the discriminator circuit determines the electric quantity of the coil impedance or the electric quantity of the electrostatic capacitance to the ground. By carrying out processing in this way, the ratio of the number of impedance components changed by approach to a conductor such as a metal to the number of impedance components of all the coils can be increased. Thus, the sensitivity of the sensor unit can be improved. In addition, it is possible to detect the positions of an approaching object in the transversal and longitudinal directions of the vehicle.

The discriminator circuit identifies the positions of an approaching object in the transversal direction of the vehicle based on the determination results. Thus, a countermeasure to operate the pedestrian protection apparatus serving as a member approaching an approaching object can be implemented.

It is preferable to provide a compensation circuit for compensating the sensor unit for electrical-quantity changes of the coil impedance, which are caused by changes in coil electrical resistance. The changes in coil electrical resistance are caused by changes in temperature. By providing such a compensation circuit, output voltage variations caused by changes in coil electrical resistance, which are caused by changes in temperature, can be reduced so that the sensitivity can be improved. For example, a temperature is detected and, based on the detected temperature, the voltage output by an alternating current power supply and a voltage detected from a coil can be changed. In addition, the frequency of the alternating current power supply can also be changed in accordance with the temperature. Of course these changes are made in a direction of preventing the output voltage from varying due to changes in temperature.

It is preferable to provide a configuration including a dummy coil, which has a coil impedance about equal to the coil impedance of the coil in a state of facing no approaching object, is connected in parallel to a parallel connection capacitor and has a temperature resistance change rate about equal to that of the coil, wherein the electrostatic capacitance of the parallel connection capacitor is approximately equal to the electrostatic capacitance to the ground, that is, the electrostatic capacitance of the to-the-ground capacitor in a state of facing no approaching object, and the dummy coil is magnetically shielded against the approaching object. By having such a configuration, the output voltage can be effectively prevented from varying due to electrical resistance changes (caused by changes in temperature) of the coil for detecting an approaching object.

It is preferable to provide a configuration in which the alternating current power supply outputs an alternating current voltage having a plurality of frequencies to the coil and the discriminator circuit processes the electrical quantity separately for each of the frequencies. By carrying out the processing in this way, from obtained electrical quantities, quantities such as the electrical quantity of the eddy current and the electrostatic capacitance to the ground can be found by processing precisely.

It is preferable to set the frequency f of the alternating current power supply at a value in the bandwidth range 15% to 85% including the central value of 50% where the value of 0% corresponds to a first frequency frc and the value of 100% corresponds to a second frequency frp. By setting the frequency f of the alternating current power supply at a value in such a bandwidth range, the sensor sensitivity can be further improved. In a state of facing no approaching object, the to-the-ground electrostatic capacitance of the capacitor to the ground is set at a value in the range 10% to 300% of the electrostatic capacitance of the parallel connection capacitor. With this setting, the sensor sensitivity can be further improved.

It is preferable to provide a configuration including an approximately rectangular flat sheet coil having a coil central axis set in an approximately horizontal direction and in a direction approximately perpendicular to a coil setting portion of the vehicle as well as a long side oriented about horizontally on the front or rear face of the vehicle in the transversal direction of the vehicle or provided about horizontally on any of the side faces of the vehicle in the longitudinal direction of the vehicle.

The approximately rectangular flat sheet coil can be embedded in a bumper or a resin mold with ease. In addition, since the approximately rectangular flat sheet coil is capable of differentiating a metallic body and a human body from each other with ease in comparison with the ultrasonic wave method and the electrostatic capacitance method, it is possible to avoid a problem caused by the pedestrian protection apparatus operating in response to a collision with a metallic body.

It is preferable to use the spiral sheet coil made by forming a turn conductor into an eddy state as the sheet coil described above. By using such the spiral sheet coil, a required inductance and a detection area can be ensured and, at the same time, the thickness of sheet coil can be reduced. Thus, a detection area can be set widely in the surroundings of the vehicle at a high detection sensitivity without losing the beautiful appearance of the vehicle.

It is preferable to provide a configuration in which a plurality of sheet coils adjacent to each other is arranged in upper and lower arrays on the front, rear, or side face of the vehicle. Based on the electrical quantity representing the coil impedance of each of the sheet coils, the discriminator circuit is capable of discriminating between a short metallic body at a low position not hindering the running state of the vehicle and a tall metallic body at a high position hindering the running state of the vehicle.

It is assumed for example that two coils are provided on the vehicle in the vertical direction. When the coil impedance of the lower coil indicates a detected situation as a detected value greater than a value detected by the upper coil by a difference exceeding a threshold value, the situation can be interpreted typically as a railroad track. Thus, any metallic body falling or laid on a road to serve as no hindrance to the running state of the vehicle can be prevented from being detected incorrectly as a hindrance to the running state of the vehicle.

Voltages with different frequencies are applied to the sheet coils and, for each of the sheet coils, the discriminator circuit extracts only a frequency component corresponding to a frequency assigned to the sheet coil, and uses the extracted frequency component as the electrical quantity. By doing so, the number of interferences between the two coils can be reduced.

The sheet coils are created so that their magnetic flux generation directions are opposite to each other. Thus, since the magnetic fluxes generated by the two sheet coils in a space between the two sheet coils strengthen each other, the magnitude of an eddy current flowing in the metallic body increases. As a result, the detection sensitivity can be increased.

It is preferable to create the two sheet coils close and adjacent to each other in such a way that their magnetic flux generation directions are opposite to each other. Thus, since the magnetic fluxes generated by the two sheet coils in a space between the two sheet coils strengthen each other, the magnitude of an eddy current flowing in the metallic body increases. As a result, the detection sensitivity can be increased.

The short sides of the two sheet coils close and adjacent to each other may overlap each other or may be adjacent to each other with neither a gap nor the electrode existing between them. By placing the sheet coils in this way, the detection sensitivities of the sheet coils by no means lowers even when an approaching object gets close to the boundary between the adjacent two sheet coils or the vicinity of the boundary.

By placing the short sides of the two sheet coils adjacent to each other with the gap between the short sides made as small as possible, the coil sensitivity can be improved. In this case, however, it is preferable to make the magnetic flux generation directions of the two sheet coils opposite to each other. When the short sides of the two sheet coils overlap each other, it is preferable to make the magnetic flux generation directions of the two mutually close or adjacent sheet coils coincide with each other. With the short sides of the two sheet coils overlapping each other, when an approaching object changes the coil impedances of the two sheet coils at the same time, for example, the approach to the approaching object can be determined to be approach to the boundary between the two sheet coils.

When the change in coil impedance in the specific one of the sheet coils is greater than the change in coil impedance in the other sheet coil, the change in coil impedance in the specific sheet coil can be determined to be a change indicating that the approaching object is being approached by a portion other than the boundary between the two sheet coils.

It is preferable to provide a configuration in which the discriminator circuit carries out a determination process by using different threshold values for the electrical quantity of a center sheet coil selected among a plurality of mutually close and adjacent sheet coils arranged in the transversal or longitudinal direction of the vehicle and the electrical quantity of an edge sheet coil selected among the adjacent sheet coils. The center sheet coil is adjacent to sheet coils provided on both sides and affected by magnetic fields generated by the adjacent sheet coils on both sides.

When the center sheet coil generates a magnetic field at the same frequency as the frequency of the magnetic fields generated by the adjacent sheet coils on both sides, an effect of a mutual inductance between these sheet coils modulates the output. In the case of an edge sheet coil, on the other hand, an adjacent sheet coil exists only on one side of the edge sheet coil. In this case, the effect of the mutual inductance described above on the modulation of the output is small.

In addition, in the case of a vehicle coated with a metallic material, for example, the entire surface can be coated with the metallic material without differentiating areas inside and outside a coil from each other. When an area inside a coil is not coated with the metallic material, however, a surface coated with the metallic material generates an eddy current. Thus, the area of a face coated with the metallic material penetrated by a magnetic flux at a center coil is different from the area of a face coated with the metallic material penetrated by a magnetic flux at an edge coil. This difference brings about a difference in output between both the coils.

In order to solve this problem, the present invention sets a difference in detection threshold value at least between a center coil and a periphery coil among coils arranged in the transversal or longitudinal direction. Since the shape of the car body made of a magnetic material and the area of a metallically coated face vary from coil to coil, which are arranged in the transversal or longitudinal direction, the value of the coil impedance also varies from coil to coil. For each of the coils, it is thus preferable to set a detection threshold value optimum for the coil. By setting an optimum detection threshold value for each of the coils, best detection precision can be obtained for each of the coils.

An electrode of the capacitor to the ground is oriented in parallel to the long side of the sheet coil and provided at a location adjacent to the coil below or above the coil. By providing the electrode in this way, the number of cases in which the detection area of the capacitor to the ground and the detection area are shifted in the transversal, longitudinal and vertical direction, is reduced so that the differentiation precision can be improved.

Since the electrode is created with a width greater than the outermost turn of the sheet coil, the sensitivity of the capacitor to the ground can be improved.

Since the electrode is designed by creating the outermost turn of the spiral sheet coil with a width greater than the other turns of the spiral sheet coil, the sensitivity of the capacitor to the ground can be improved.

The sheet coil is held by a bumper made of resin. By holding the sheet coil in this way, the sheet coil can be separated from the vehicle body, which is a large magnetic body having a large eddy current loss, by a distance in a possible range. Thus, a magnetic flux for detection can be prevented from spreading and the detection sensitivity can be improved. In addition, the magnitude of the eddy current loss can be reduced. Furthermore, the beautiful appearance of the vehicle can be prevented from deteriorating and the electrical insulation of the sheet coil can be ensured with ease. It is preferable to fix the sheet coil on the bumper or integrate the coil with the bumper. For example, the sheet coil is directly printed on the bumper or stuck to the bumper.

The sheet coil is characterized in that the coil is non-magnetic and has a large specific resistance. The sheet coil is accommodated in a coil accommodation chamber formed between the bumper and a pressing plate provided on the back face of the bumper. The sheet coil is accommodated in the coil accommodation chamber in such a way that the coil can be displaced relatively to the bumper.

By accommodating the sheet coil in this way, when the bumper is dented partially, the sheet coil is displaced similarly to the bumper, forming a dented shape similar to that of the bumper. Thus, a large tensile force is never applied to a conductor wire of the sheet coil to break the coil. In addition, when the bumper is replaced with another one, the sheet coil can be reused.

The pressing plate is penetrated by a large number of holes in the thickness direction of the pressing plate. Typically, the pressing plate is created from resin to form a mesh shape. By creating the pressing plate in this way, the sheet coil can be prevented from losing its mobility due to earth and sands, which are blocking the surroundings of the coil after mucky water or the like introduced into the sheet coil dries.

The pressing plate has a power supplying line for supplying power to the sheet coils or an output signal line for fetching an electric potential appearing at one end of each of the sheet coils. The power supplying line or the output signal line is connected to the end of each of the sheet coils. By connecting the line in this way, wiring to the sheet coils can be simplified. For example, by connecting the output signal line to the end on the outermost side and the power supplying line to the turn on the innermost side, the sheet coil can be constructed from a single layer flexible printed wiring board.

The pressing plate has flexibility at least equivalent to that of the bumper. By providing such a pressing plate, the bumper can be prevented from being deformed.

The spiral sheet coil is constructed from a single layer flexible printed wiring board. By constructing the spiral sheet coil in this way, the coil can be made simple. It is to be noted that, by flattening the single layer flexible printed wiring board after folding back and convolving the board, a multiple layer spiral sheet coil can be constructed. Thus, the number of turns can be increased without reducing the width of the conductor line. It is to be noted that creation of an electrode of the capacitor to the ground on the single layer flexible printed wiring board at the same time is appropriate.

Since the discriminator circuit is mounted on the single layer flexible printed wiring board, the length of the output signal line from the sheet coil or the capacitor to the ground to the discriminator circuit can be reduced. Thus, a signal loss caused by the impedance of the output signal line and electromagnetic noises superposed on the output signal line can be reduced. It is to be noted that the alternating current power supply can also be mounted on the single layer flexible printed wiring board. In this case, the power supplying line connecting the alternating current power supply to the sheet coil can also be created on the single layer flexible printed wiring board in the same way.

A connection line created on the single layer flexible printed wiring board as a line connecting the discriminator circuit to the spiral sheet coil is magnetically shielded. By shielding the connection line in this way, the number of misdetections caused by electromagnetic noises generated by the engine can be reduced. Similarly, the power supplying line extended from the alternating current power supply to the sheet coil can also be magnetically shielded.

The single layer flexible printed wiring board has a plurality of spiral sheet coils arranged in the longitudinal or transversal direction of the vehicle. The discriminator circuit individually discriminates the electric quantity of the coil impedance of each sheet coil or the electric quantity of the to-the-ground capacitance of the capacitor to the ground between a metallic body and a human body. That is, in this configuration, a plurality of spiral sheet coils is created in the single layer flexible printed wiring board. Thus, the number of components can be reduced and the number of man-hours required for the assembly work can also be reduced as well. In addition, the number of sheet coils can be increased easily.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
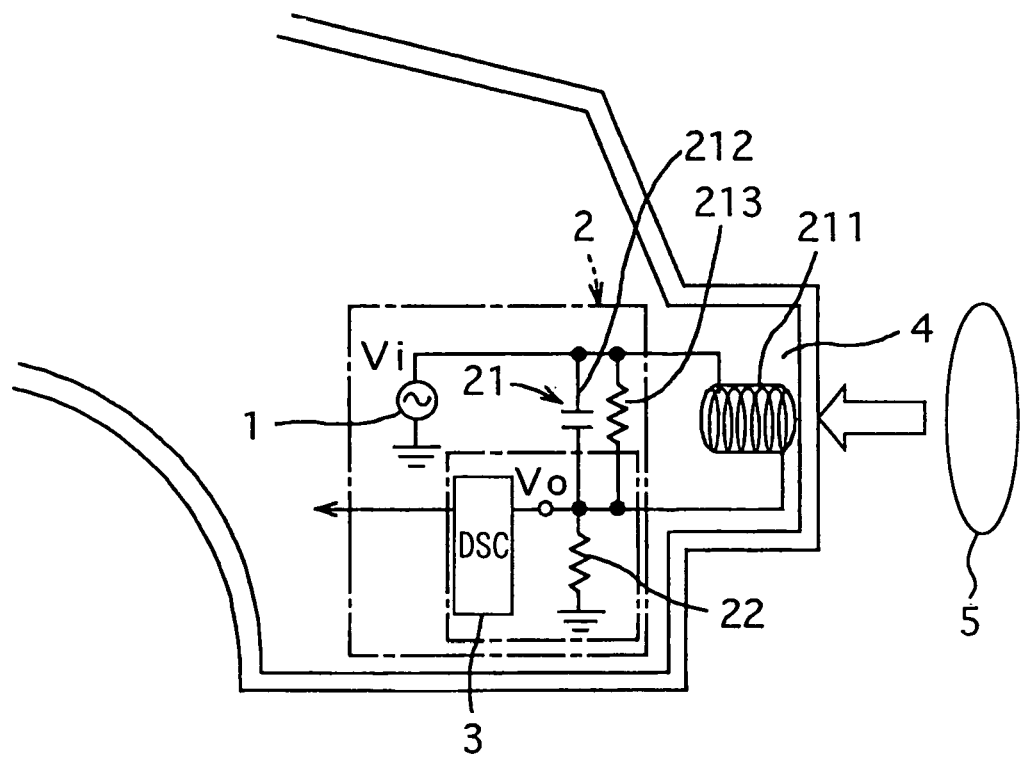
FIG. 1 is a schematic circuit diagram showing a first embodiment of the present invention.

The present invention will be described in further detail with reference to various embodiments shown in the drawings.

[First Embodiment]

In FIG. 1, reference numeral 1 denotes an alternating current power supply, which is a sinusoidal oscillator having a low output impedance, and reference numeral 2 denotes a sensor unit. Reference numeral 3 denotes a discriminator circuit. The sensor unit 2 comprises an alternating current impedance circuit 21 and a voltage drop detection resistor 22, which are connected in series. The alternating current impedance circuit 21 comprises a coil 211, a capacitor 212 and a resistor 213, which are connected to each other in parallel. The coil 211 is embedded in a bumper 4 of the vehicle.

One terminal of the alternating current power supply 1 is connected to one terminal of the alternating current impedance circuit 21. The other terminal of the alternating current power supply 1 and one end of the voltage drop detection resistor 22 are connected to the ground. A voltage drop along the voltage drop detection resistor 22 is supplied to the discriminator circuit 3. The resonance frequency of a parallel LC circuit comprising the coil 211 and the capacitor 212 is set at a value greater than the oscillation frequency of the alternating current power supply 1.

The discriminator circuit 3 extracts oscillation frequency components corresponding to the frequencies of the alternating current power supply 1 by using a band pass filter from a voltage output by the sensor unit 2, and then rectifies the oscillation frequency components. Specifically, the discriminator circuit 3 smoothes the oscillation frequency components to generate a direct current signal voltage and converts the voltage into a digital signal. The discriminator circuit 3 then supplies the digital signal to a microcomputer for detecting approach to an object (or an approaching object) 5 and determining the type of the object 5. The voltage output by the sensor unit 2 is a voltage drop along the voltage drop detection resistor 22.

As an alternative, a comparator circuit directly evaluates this direct current signal voltage. When a comparator is employed, the comparator includes a comparator circuit having a first comparator and a second comparator. The first comparator has a first threshold value greater than the direct current signal voltage generated without existence of an object by a predetermined difference. On the other hand, the second comparator has a second threshold value smaller than the direct current signal voltage generated without existence of an object by a predetermined difference.

When the first comparator determines that the direct current signal voltage is greater than the first threshold value, impending approach is determined to be approach of a metallic body. When the second comparator determines that the direct current signal voltage is smaller than the second threshold value, on the other hand, impending approach is determined to be approach of a pedestrian. Since the circuit configuration of the discriminator circuit 3 itself is commonly known, no description of the discriminator circuit 3 with reference to figures is given.

Figure 2:
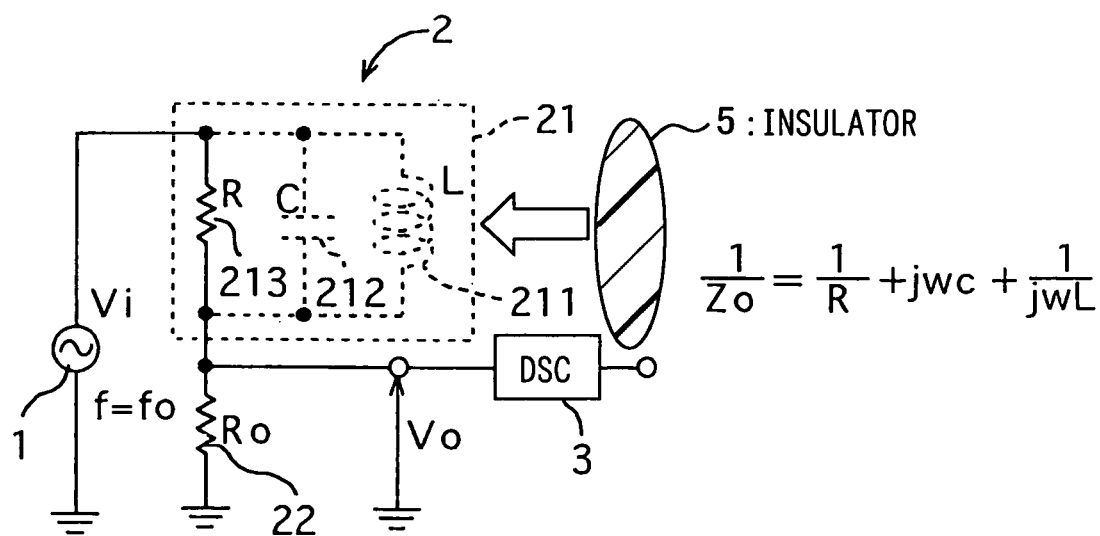
FIG. 2 is a diagram showing an equivalent circuit for a case in which an electric insulator is approaching the circuit shown in FIG. 1.
Figure 3:
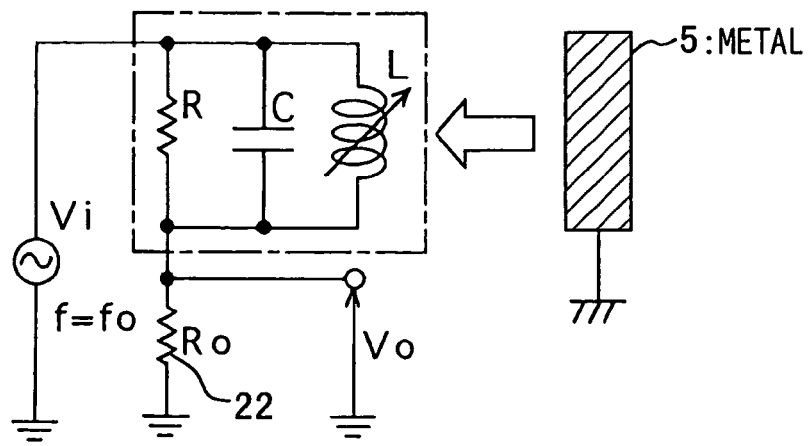
FIG. 3 is a diagram showing an equivalent circuit for a case in which a metallic body is approaching the circuit shown in FIG. 1.
Figure 4:
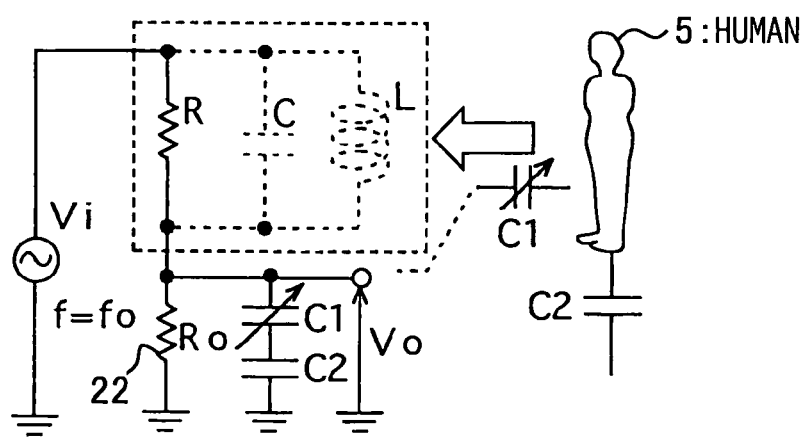
FIG. 4 is a diagram showing an equivalent circuit for a case in which a human body is approaching the circuit shown in FIG. 1.

A method for differentiating approaching bodies 5 from each other by using this circuit is explained by referring to FIGS. 2 to 4. In these figures, reference notation L denotes the inductance of the coil 211 and reference notation C denotes the electrostatic capacitance of the capacitor 212. Reference notations R and Ro denote the resistances of the resistor 213 and the voltage drop detection resistor 22, respectively. Reference notation Vi denotes a voltage output by the alternating current power supply 1 and reference notation Vo denotes the voltage drop along the voltage drop detection resistor 22. This voltage drop is also a voltage output by the sensor unit 2. Reference notation Zo denotes the combined alternating current impedance of the alternating current impedance circuit 21.

FIG. 2 is a diagram showing a case in which the approaching object 5 is an electrical insulator. The capacitor 212 can be provided separately from the coil 211, provided as a capacitor having a distributed capacitance of the coil 211 or provided as a capacitor including the distributed capacitance of the coil 211. The resistor R can be provided separately from the coil L or as a resistor having an internal resistance of the coil L itself.

When the approaching object 5 is an electrical insulator, the approaching object 5 does not have an electrical effect on the sensor unit 2. Thus, the output voltage Vo generated by the sensor unit 2 does not change. It is to be noted that, when the approach of the approaching object 5 is detected by using an ultrasonic sensor unit or the like, the output voltage Vo generated by the sensor unit 2 does not change without regard to this approach. Thus, the approaching object 5 can be determined to be an object other than an electrical insulator or an object other than a human being.

FIG. 3 is a diagram showing a case in which the approaching object 5 is a metallic body such as a body made of aluminum. In this case, approach of the metallic body causes an eddy current to flow in the metallic body and the coil impedance Zc of the coil 211 to decrease.

Thus, the combined alternating current impedance of the alternating current impedance circuit 21 decreases and the voltage drop along the voltage drop detection resistor 22, that is, the output voltage Vo generated by the sensor unit 2, increases. That is, an increase in output voltage Vo can be used as an indicator for determining that a metallic body is approaching.

When the approaching object 5 is made of a magnetic material such as soft iron, the inductance of the coil 211 increases. An increase in eddy current loss has a bigger effect on the decrease of the coil impedance Zc of the alternating current impedance circuit 21 than the increase of the inductance of the coil 211 does. The voltage drop of the alternating current impedance circuit 21 itself decreases.

Much like a human body, these metallic bodies also increase the capacitance of the capacitor connected in parallel to the voltage drop detection resistor 22 and have an effect of reducing the voltage drop along the voltage drop detection resistor 22. Since the effect of the decrease of the voltage drop of the alternating current impedance circuit 21 due to the increase in eddy current loss, which is caused by a metallic body, is greater than the decrease of the voltage drop along the voltage drop detection resistor 22 due to an increase in a capacitor capacitance, however, it is known that the output voltage Vo generated by the sensor unit 2 increases when a metallic body approaches the vehicle.

FIG. 4 is a diagram showing a case in which the approaching object 5 is a human body. A human body has a substantially large specific resistance in comparison with a metallic body. Specifically, the specific resistance of a human body is greater than that of a metallic body by a difference of at least 2 digits. Thus, the eddy current caused by the coil 211 can almost be ignored.

Since the area of the surface of a human body is large, on the other hand, the electrostatic capacitance C1 between the human body and the coil 211 is large. From the circuit point of view, the electrostatic capacitance C1 is an electrostatic capacitance between the human body and a connection point between the coil 211 and the voltage drop detection resistor 22. It is assumed that C1 is the electrostatic capacitance between the connection point and the human body where the connection point is a point between the human body and a contact point between the alternating current impedance circuit 21 and the voltage drop detection resistor 22.

In addition, it is assumed that C2 is the to-the-ground electrostatic capacitance of the human body. In this case, the connection point is connected to the ground through a series circuit comprising the electrostatic capacitances C1 and C2. As a result, the series circuit of the electrostatic capacitances is connected in parallel to the voltage drop detection resistor 22.

Since the combined alternating current impedance of the series circuit and the voltage drop detection resistor 22 decreases, the voltage drop along the voltage drop detection resistor 22 or the output voltage Vo generated by the sensor unit 2 also decreases as well. That is, when the output voltage Vo decreases, the approaching object can be determined to be a human body.

It is to be noted that the connection point can be regarded as an electrode of the to-the-ground capacitor connected in parallel to the voltage drop detection resistor 22. In addition, a turn conductor of the coil 211 on this connection-point side also serves as this electrode.

Figure 5:
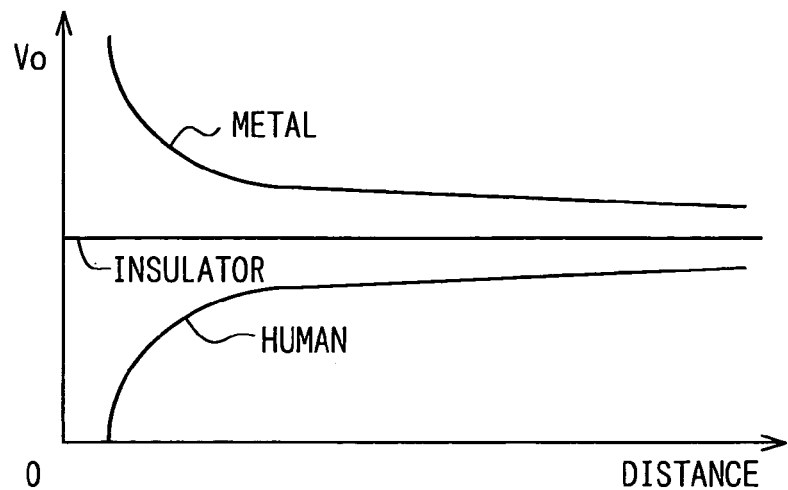
FIG. 5 is a graph showing characteristic curves representing output characteristics of the circuit shown in FIG. 1 as characteristics obtained as computation results.
Figures 6A, 6B:
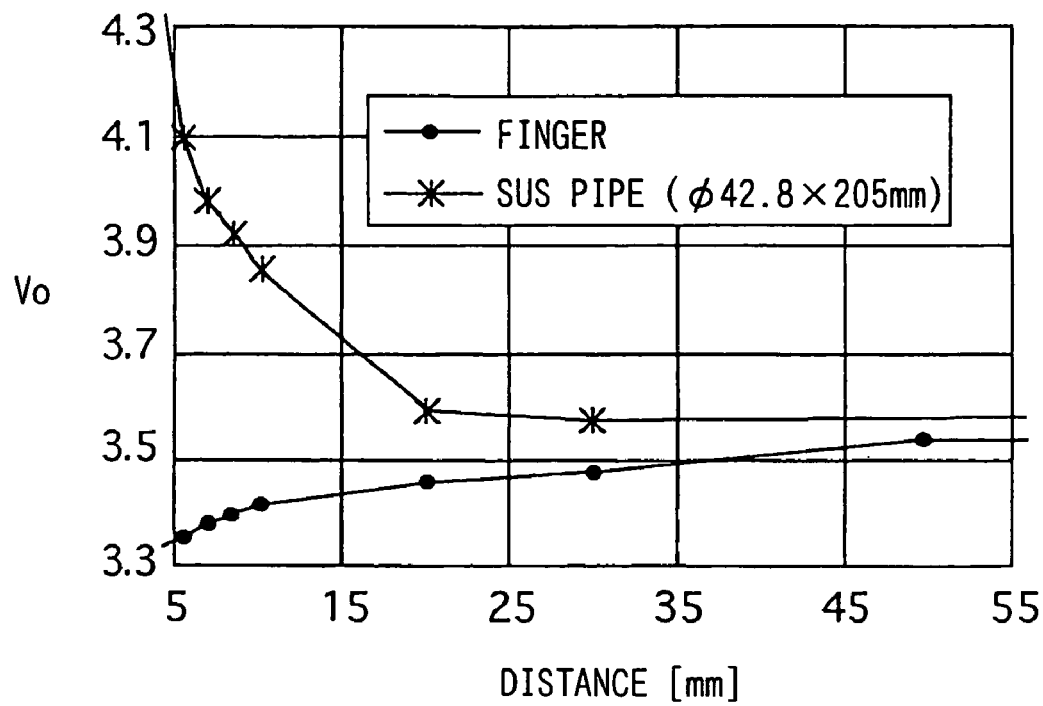
FIG. 6A is a graph showing characteristic curves representing output characteristics of the circuit shown in FIG. 1 as characteristics obtained as measurement results.
FIG. 6B is a table showing circuit constants.

FIG. 5 shows curves representing typical computed changes in output voltage Vo for cases in which a human body, a metal and an electrical insulator (or a substance other than a human body and a metal) approaches the coil 211 in the bumper 4. FIG. 6A shows actual experimental measurement results of the changes in output voltage Vo. This measurement was conducted with the circuit constants shown in FIG. 6B.

Figure 7:
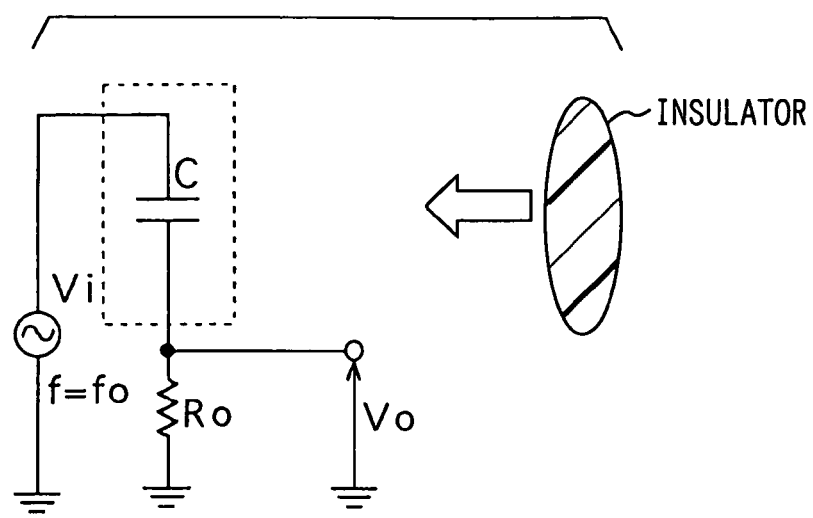
FIG. 7 is a diagram showing an equivalent circuit for a case in which an electric insulator is approaching an electrostatic capacitor.
Figure 8:
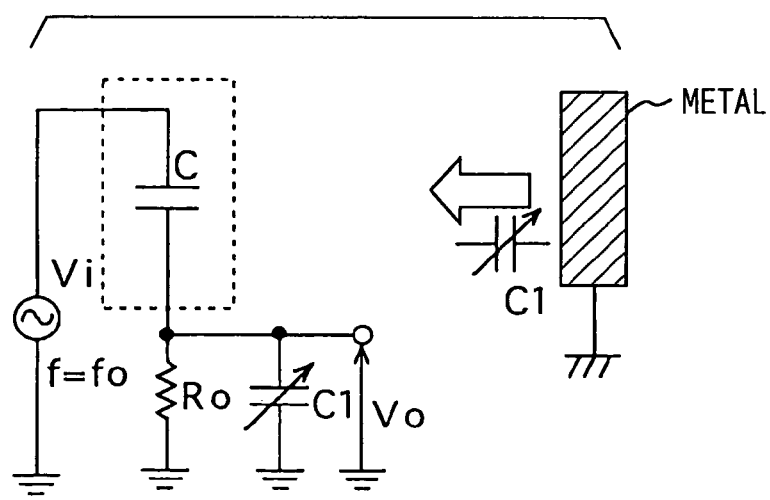
FIG. 8 is a diagram showing an equivalent circuit for a case in which a metallic body is approaching an electrostatic capacitance sensor implemented by the first embodiment.
Figure 9:
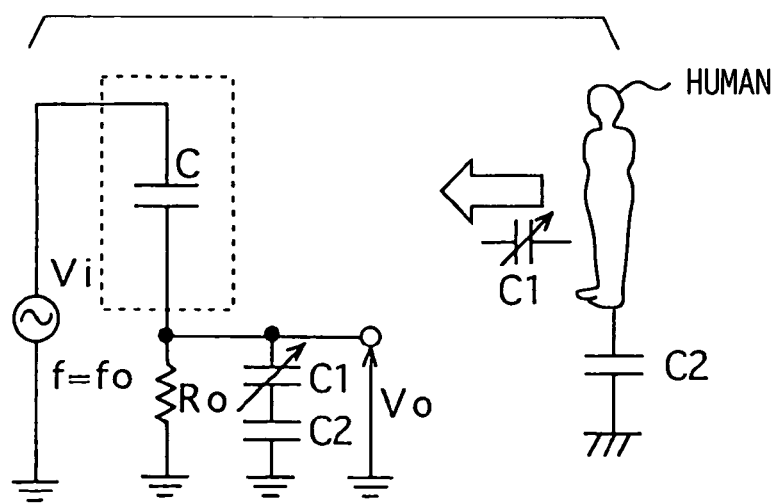
FIG. 9 is a diagram showing an equivalent circuit for a case in which a human body is approaching an electrostatic capacitance sensor implemented by the first embodiment.

For the purpose of comparison, the following description explains changes of the alternating impedance of an electrostatic sensor unit and changes in output voltage Vo, which are caused by the changes in alternating impedance, by referring to FIGS. 7, 8 and 9 showing, respectively, an electrical insulator, a metal and a human body approaching the capacitor C of an electrostatic sensor unit.

FIG. 7 shows a case in which an electrical insulator is approaching the capacitor C of the electrostatic sensor unit. In this case, the output voltage Vo of course does not change.

FIG. 8 shows a case in which a grounded metallic body is being approached by the capacitor C of the electrostatic sensor unit. In this case, since an electrostatic capacitance C1 is connected in parallel to the voltage drop detection resistance Ro, a voltage drop is generated along the voltage drop detection resistor 22 and the output voltage Vo decreases.

FIG. 9 shows a case in which a human body is approaching the capacitor C of the electrostatic sensor unit. In this case, as described earlier, a series circuit consisting of the electrostatic capacitances C1 and C2 is connected in parallel to the voltage drop detection resistance Ro. Thus, the voltage drop along the voltage drop detection resistor 22, that is, the output voltage Vo, decreases even though the decrease is not so big as the decrease for the approach to a metallic body.

Figure 10:
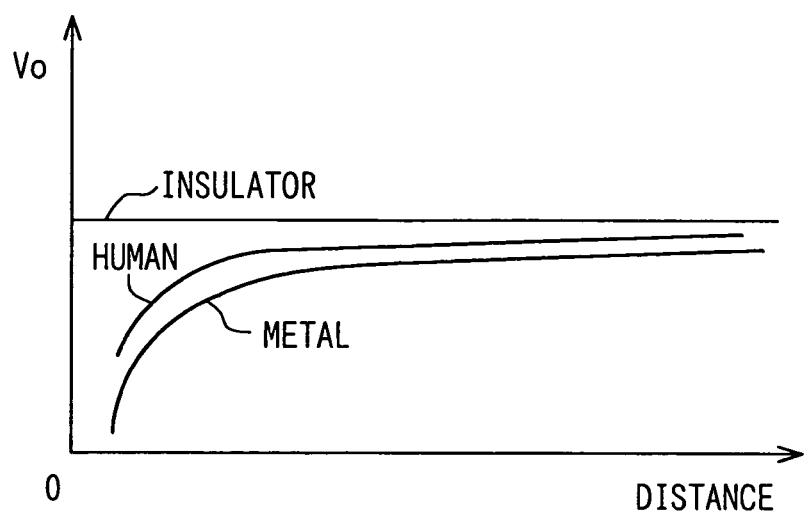
FIG. 10 is a graph showing characteristic curves representing output characteristics of an electrostatic capacitance sensor implemented by the first embodiment as characteristics obtained as computation results.

FIG. 10 shows curves representing typical computed changes of the output voltage Vo generated by the electrostatic capacitance sensor unit for cases in which the coil 211 approaches a human body, a metal, and an electrical insulator (or a substance other than a human body and a metal).

Comparison of FIG. 5 with FIG. 10 clearly indicates that, in the sensor unit implemented by the first embodiment (FIGS. 1 to 4), a human body and a metallic body are differentiated from each other by the fact the human body has an effect on the output voltage Vo in a voltage change direction opposite to the direction of an effect of the metallic body on the voltage Vo so that excellent differentiation precision can be obtained.

Figure 11:
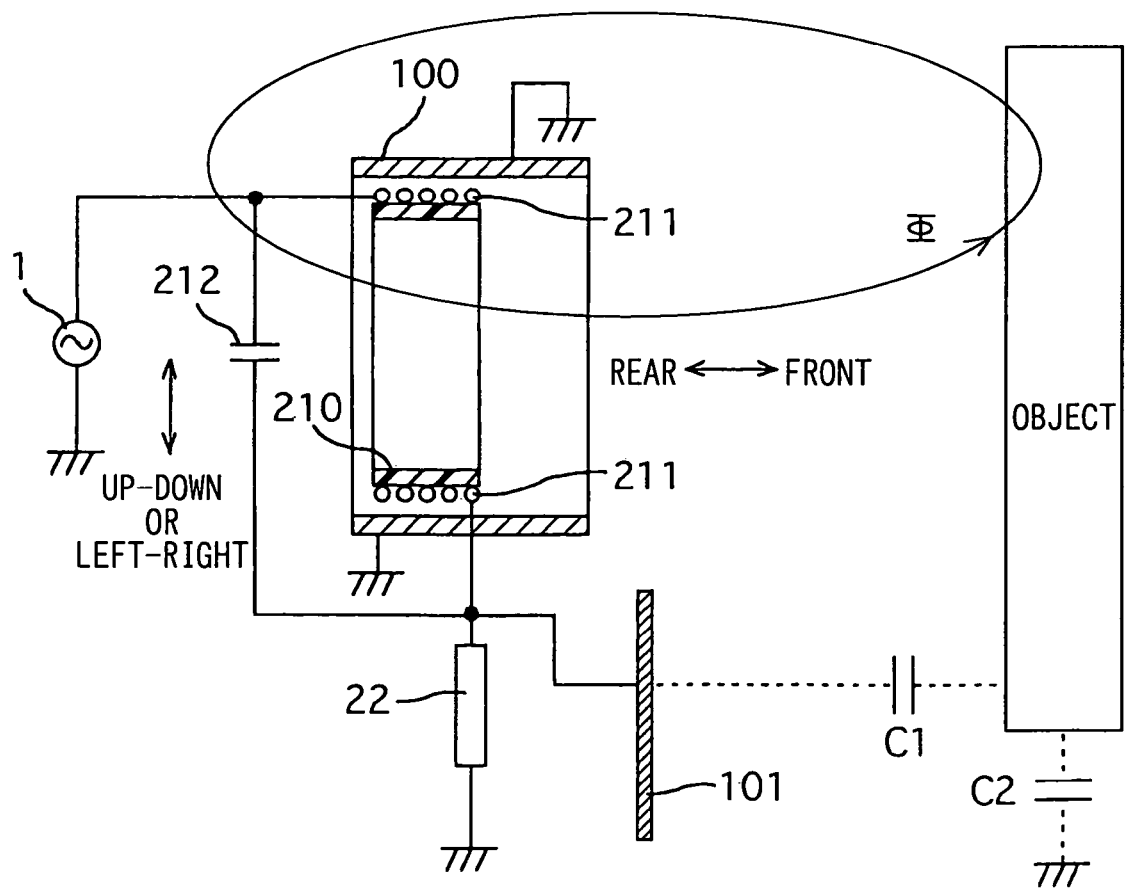
FIG. 11 is a schematic diagram showing a modification of the first embodiment of the present invention.

As a modification of the first embodiment shown in FIG. 1, as shown in FIG. 11, the coil 211 is wound around a bobbin 210 to form a shape with a large radius and a short axis. An opening toward the forward direction is provided. By creating such a coil 211, a magnetic flux generated by the coil 211 is capable of reaching a target object with ease. Thus, the sensitivity to detect a metallic body is improved.

In this modification, a metallic cylinder 100 having an opening at each of its ends is provided to surround the coil 211. The metallic cylinder 100 is connected to the ground. By providing such a configuration, the metallic cylinder 100 is capable of reducing the sensitivity of the coil 211 in the radial direction of the coil 211 but relatively raising the sensitivity in the forward direction.

It is to be noted that the metallic cylinder 100 can also be connected to a connection point between the coil 211 and the voltage drop detection resistor 22, and used as an electrode of the aforementioned capacitor to the ground. Naturally, in this case, the metallic cylinder 100 is not connected to the ground.

A metallic plate 100 is connected to the connection point between the coil 211 and the voltage drop detection resistor 22. The metallic plate 101 is oriented in the transversal and vertical directions. By providing the metallic plate 101 in this way, the electrostatic capacitance C1 between the metallic plate 101 and a human body at the front position can be increased and the sensitivity to detect the human body can thus be improved.

In addition, while the coil 211 of the alternating current impedance circuit 21 is provided in the bumper of the vehicle, a plurality of such coils can also be provided separately at different positions in the bumper.

[Second Embodiment]

Figure 12:
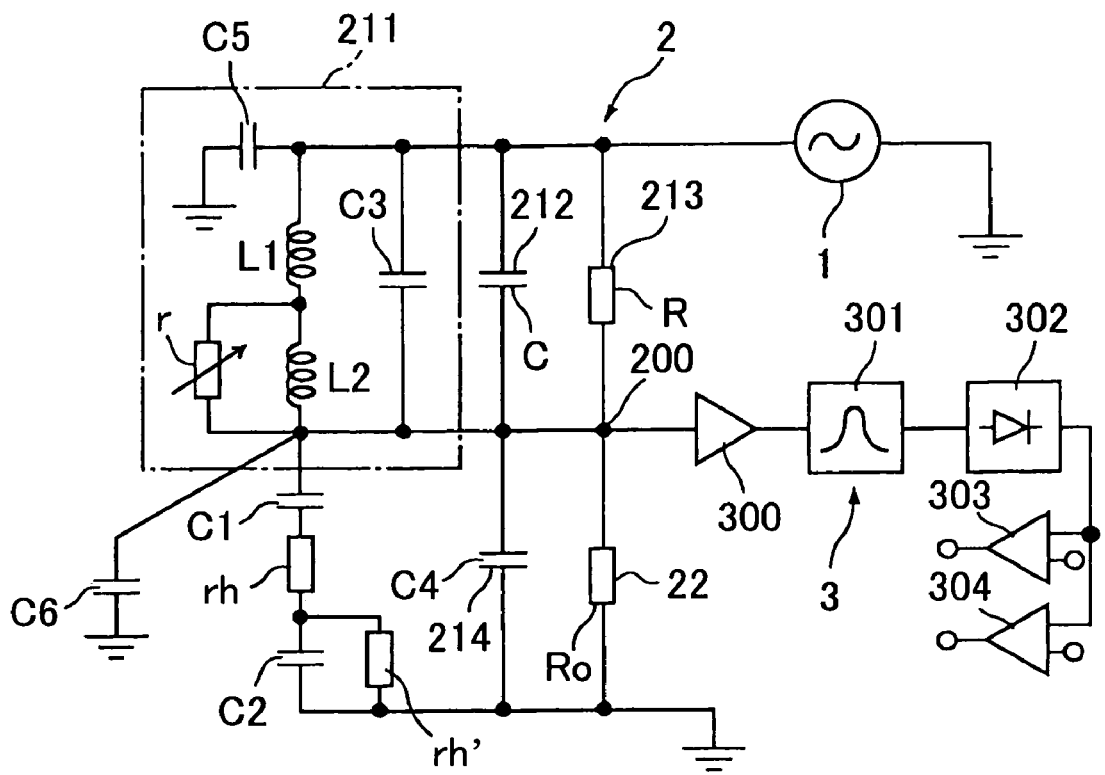
FIG. 12 is a circuit diagram showing a detailed equivalent circuit of a sensor unit implemented by a second embodiment of the present invention.

As shown in FIG. 12, the second embodiment is constructed by connecting an external capacitor 214 having an electrostatic capacitance C4 in parallel to the voltage drop detection resistor 22 in the configuration shown in FIG. 1.

The coil 211 is represented by an equivalent circuit comprising inductances L1 and L2, a resistance r as well as a distributed capacitance C3. However, the electrical resistance of the coil 211 is ignored. When the electrical resistance of the coil 211 needs to be taken into consideration, the resistance can be included in series to the inductance L1.

The inductance L1 is a leakage inductance, the flux of which does not interlink with an object. On the other hand, the inductance L2 is an exciting inductance, the flux of which does interlink with an object. Reference notation r denotes a resistor, which is an equivalent resistor of an eddy current loss. The resistor r is connected in parallel to the inductance L2. The distributed capacitance C3 is defined as electrostatic capacitances between turns of the coil 211. The distributed capacitance C3 is represented by an equivalent capacitor connected in parallel to a series circuit comprising the inductances L1 and L2. In addition, a parasitic electrostatic capacitance exists between the turns of the coil 211 and the earth. In FIG. 12, this parasitic electrostatic capacitance is shown as electrostatic capacitances C5 and C6.

A resistor 213 and the voltage drop detection resistor 22 have the function of bias resistors for setting an offset level of an output voltage Vo output from a connection terminal 200, which is an output terminal.

Reference notation C1 denotes an electrostatic capacitance between the connection terminal 200 and an approaching object whereas reference notation C2 denotes an electrostatic capacitance between the approaching object and the earth. Reference notation rh denotes an internal electrical resistance of the approaching object and reference notation rh' denotes a to-the-ground resistance of the approaching object.

The output voltage Vo appearing at the connection terminal serving as the connection terminal 200 is amplified by a first stage amplifier 300. Then a band pass filter 301 extracts only oscillation frequency components of an alternating voltage Vi output by the alternating current power supply 1 from the amplified output voltage Vo. The amplified output voltage Vo, from which the oscillation frequency components have been extracted, is supplied to a detection/smoothing circuit 302 for converting the voltage Vo into a direct current signal voltage. The alternating current signal voltage output by the detection/smoothing circuit 302 is finally supplied to comparators 303 and 304.

Figure 13:
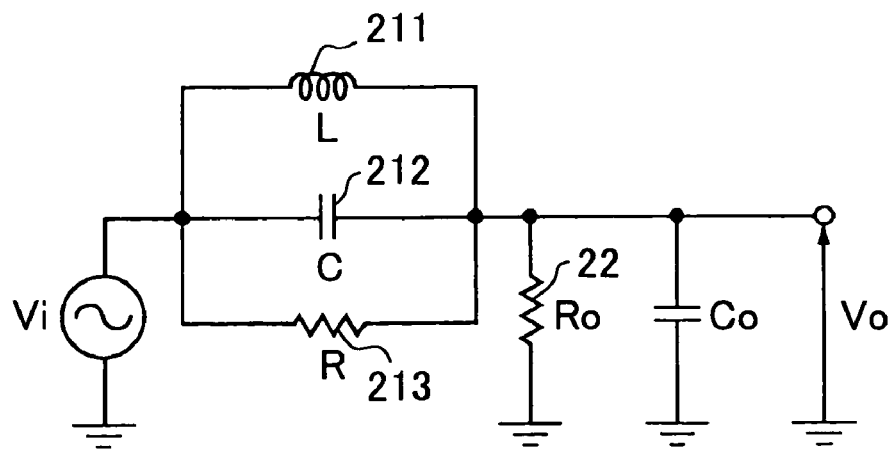
FIG. 13 is a diagram showing a simplified equivalent circuit of the equivalent circuit shown in FIG. 12.

The circuit shown in FIG. 12 is simplified into an equivalent circuit shown in FIG. 13. The coil 211, the capacitor 212, and the resistor 213 are represented by their respective equivalent components, i.e., an inductance L, an electrostatic capacitance C and a resistance R, which are connected to each other to form a parallel circuit.

The alternating current impedance between the connection terminal 200 and the ground are represented by an equivalent electrostatic capacitance Co and an equivalent resistance Ro, which are connected to each other to form a parallel circuit. However, the value of the electrostatic capacitance C shown in FIG. 13 is different from the value of the electrostatic capacitance C of the capacitor 212 shown in FIG. 12. This is because the electrostatic capacitance C shown in FIG. 13 includes the electrostatic capacitance of the capacitor 212 shown in FIG. 12 and the electrostatic capacitance C3 of the coil 211.

In addition, the electrostatic capacitance Co is a combined electrostatic capacitance of a combined electrostatic capacitance C, a parasitic electrostatic capacitance C6 of the coil 211, and the electrostatic capacitance C4 of the capacitor 214 where the combined electrostatic capacitance C is a combined electrostatic capacitance of the electrostatic capacitances C1 and C2 shown in FIG. 12.

Since the parasitic electrostatic capacitance C5 of the coil 211 does not have an effect on the output voltage Vo when the output resistance of the alternating current power supply 1 and the wiring impedance are small, the parasitic electrostatic capacitance C5 can be ignored for a small output resistance of the alternating current power supply 1 and a small wiring impedance. In this case, the output voltage Vo can be expressed by a computational expression in Eq. (1) as follows.

$$Vo = \frac{1/R + j \cdot (\omega C - 1/\omega L)}{1/Ro + 1/R + j \cdot (\omega(C + Co) - 1/\omega L)} Vi = \quad [\text{Eq. 1}]$$

$$\frac{\sqrt{(1/R)^2 + (\omega C - 1/\omega L)^2}}{\sqrt{(1/Ro + 1/R)^2 + (\omega(C + Co) - 1/\omega L)^2}} Vi$$

When the resistances R and Ro in Eq. (1) are assumed to have an infinite value, the frequency fo1 causing the numerator of the computational expression to become 0 is expressed by Eq. (2). On the other hand, a frequency fo2 causing the denominator of the computational expression to become 0 is expressed by Eq. (3).

$$fo1 = 1/2\pi\sqrt{(LC)} \quad [\text{Eq. 2}]$$

$$fo2 = 1/2\pi\sqrt{(L(C+Co))} \quad [\text{Eq. 3}]$$

When the resistances R and Ro are sufficiently large, the output voltage Vo becomes approximately 0V for the frequency of the alternating current voltage Vi equal to the frequency fo1. For the frequency of the alternating current voltage Vi equal to the frequency fo2, on the other hand, the output voltage Vo has an extremely large value.

Figure 14:
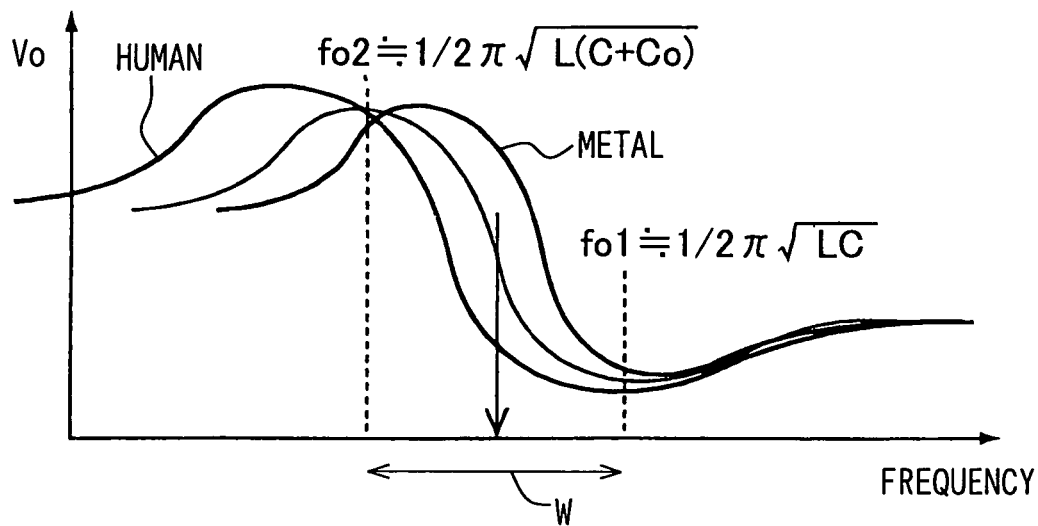
FIG. 14 is a graph showing characteristic curves representing an ideal state of relations between the frequency and output voltage of the equivalent circuit shown in FIG. 13.

Solid lines shown in FIG. 14 represent the output voltage Vo expressed by Eq. (1) for a variety of frequencies of the alternating current voltage Vi appearing in the computational expression of the equation. The solid lines also represent the output voltage Vo for a reduced coil impedance of the coil 211 and for an increased electrostatic capacitance Co. The reduced coil impedance of the coil 211 corresponds to approach of a metallic body whereas the increased electrostatic capacitance Co corresponds to approach of a human body.

As is obvious from FIG. 14, in the vicinities of the frequencies fo1 and fo2, the case of facing no approaching object, the case of facing an electrical insulator, the case of facing a metallic body, and the case of facing a human body cannot be well differentiated from each other. In addition, it is also obvious that, when the effects of the resistances R and Ro are ignored, good differentiation precision is obtained for the frequency of the alternating current voltage Vi in the frequency band W between the resonance frequencies fo1 and fo2.

In particular, the good differentiation precision is obtained for the frequency of the alternating current voltage Vi in a frequency band, which is centered at the mid value between the resonance frequencies fo1 and fo2 and has the range (the mid value−40% of the frequency band W) to (the mid value+25% of the frequency band W).

Figure 15:
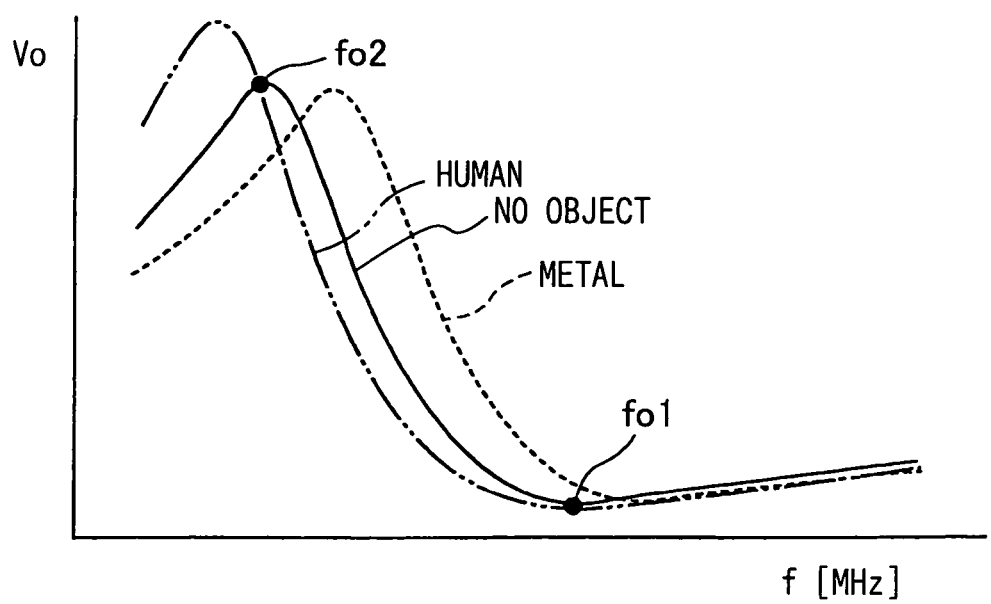
FIG. 15 is a graph showing characteristic curves representing an actual state of relations between the frequency and output voltage of the equivalent circuit shown in FIG. 13.

As an actual model, proper values are substituted to Eq. (1) for the resistances R and Ro to result in curves each representing a relation between the frequency of the alternating current voltage Vi and the output voltage Vo as shown in FIG. 15. It is obvious from the figure that good differentiation precision is obtained for the frequency of the alternating current voltage Vi in the frequency band W between the resonance frequencies fo1 and fo2.

In particular, better differentiation precision is obtained for the frequency of the alternating current voltage Vi in a narrower frequency band, which is centered at the mid value between the resonance frequencies fo1 and fo2 and has the range (the mid value−40% of the frequency band W) to (the mid value+40% of the frequency band W). More particularly, even better differentiation precision is obtained for the frequency of the alternating current voltage Vi in an even narrower frequency band, which is centered at the mid value between the resonance frequencies fo1 and fo2 and has the range (the mid value−25% of the frequency band W) to (the mid value+25% of the frequency band W).

It is to be noted that, in the second embodiment, capacitors 212 and 214 are employed. This is because these externally provided capacitors 212 and 214 can be used as capacitors for adjusting the resonance frequencies fo1 and fo2 to optimum values. That is, due to the electrostatic capacitances of these added capacitors 212 and 214, the resonance frequencies fo1 and fo2 can be set at desired values even when the inductance of the coil 211 is not that big.

In the equivalent circuit shown in FIG. 13, however, when the electrostatic capacitance Co is too large in comparison with the electrostatic capacitance C, the bandwidth between the resonance frequencies fo1 and fo2 becomes excessively large, adversely deteriorating the sensitivity. That is, as is obvious from FIG. 15, in this bandwidth, for an inductance with a large gradient of the characteristic curve, the difference in output between a metallic body and a human body is big and, the larger the gradient, the bigger the difference. That is, for a large bandwidth in the characteristic curves shown in FIG. 15, the change in output voltage Vo becomes smaller even when the inductance L and the electrostatic capacitance Co change.

When the resonance frequencies fo1 and fo2 are too close to each other, however, a decrease in output sensitivity in the vicinities of the resonance frequencies fo1 and fo2 affects the output voltage Vo. Thus, the difference between the resonance frequencies fo1 and fo2 needs to be set at least at 100 kHz to 10 MHz.

As a matter of fact, it is preferable to set the difference between the resonance frequencies fo1 and fo2 at a proper value in the range 0.3 to 3 MHz. In this case, since an increase in electrostatic capacitance Co reduces the resonance frequency fo2 relatively to the resonance frequency fo1, it is preferable to set the capacitance Co to the ground in the equivalent circuit shown in FIG. 13 at a value in the range 10 to 300% of the coil parallel connection capacitance C in the equivalent circuit shown in FIG. 13. In this case, the capacitance Co to the ground is called the electrostatic capacitance of the capacitor to the ground.

[Third Embodiment]

Figure 16:
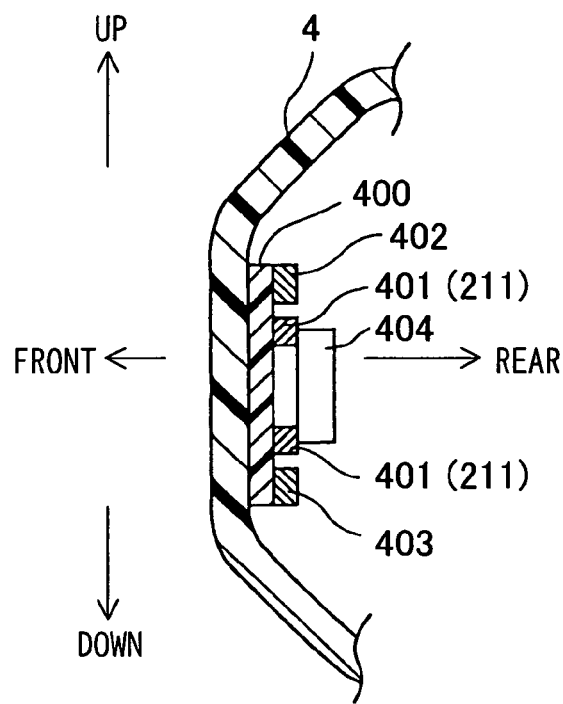
FIG. 16 is a schematic diagram showing a cross section of a state of installation of a sensor implemented by a third embodiment of the present invention.

In FIG. 16, reference numeral 400 denotes a flexible printed wiring board stuck to the bumper 4 of the vehicle. On the surface of the flexible printed wiring board 400, a square spiral sheet coil 401 corresponding to the coil 211 as well as electrode lines 402 and 403 are printed. The electrode lines 402 and 403 are the electrodes of the capacitor to the ground. It is to be noted that FIG. 16 shows a model of a portion of the spiral sheet coil 401, that is, a portion oriented on a horizontal plane in the transversal direction of the vehicle. Reference numeral 404 denotes a discriminator circuit and an alternating current power-supply circuit, which are mounted on the flexible printed wiring board 400.

The spiral sheet coil 401 is a coil created from a semiconductor layer formed on the surface of the flexible printed wiring board 400 in an eddy shape by adoption of a printing or etching technique. The spiral sheet coil 401 is a rectangular eddy coil having two long sides oriented horizontally in the transversal direction and two short sides oriented in the vertical direction.

The electrode lines 402 and 403 correspond to the metallic plate 101 shown in FIG. 11 and are connected to the connection terminal (connection unit) 200 of the circuit. The electrode lines 402 and 403 each serve as one of the electrodes of a capacitor having the electrostatic capacitance C1. The electrode line 402 is provided above the upper long side of the spiral sheet coil 401 in parallel to the long side. On the other hand, the electrode line 403 is provided beneath the lower long side of the spiral sheet coil 401 in parallel to this long side.

Figure 17:
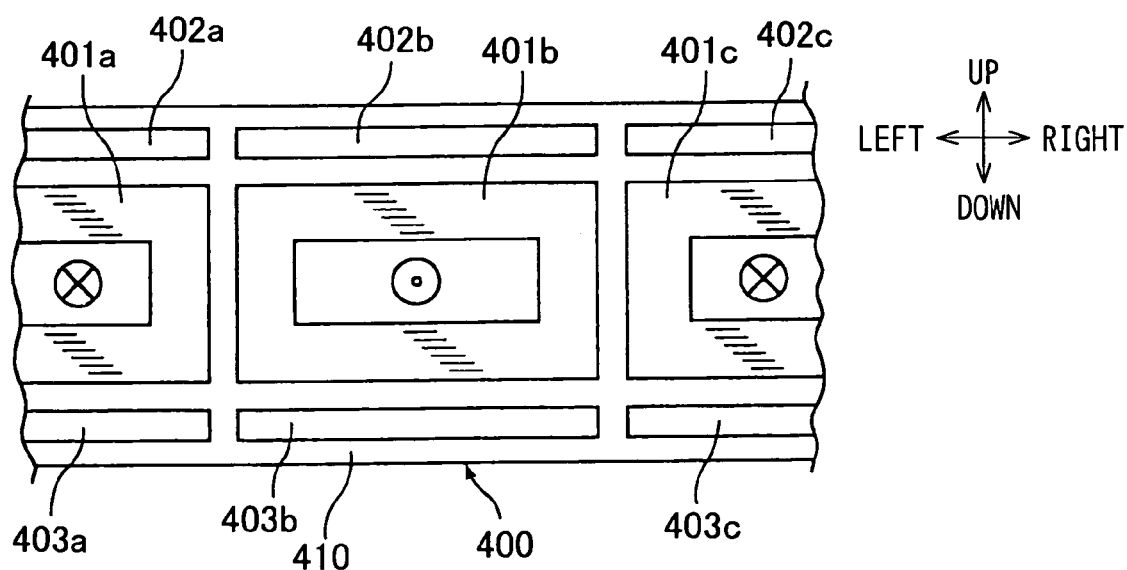
FIG. 17 is a schematic diagram showing a front view of a state of installation of a sensor implemented by the third embodiment of the present invention.

FIG. 17 is a diagram showing a partial rear-face view of the flexible printed wiring board 400 having the spiral sheet coil 401 as a view seen from a position behind the flexible printed wiring board 400. The bumper 4 is not shown in this figure.

Reference numerals 401a, 401b, and 401c each denote the spiral sheet coil 401 shown in FIG. 16. The spiral sheet coils 401a, 401b, and 401c are arranged on the back face of the bumper 4 in the transversal direction of the vehicle. The gaps between the spiral sheet coils 401a, 401b and 401c are made as small as possible. By making the gaps small, a coil impedance change caused by approach made by any of the gaps to an approaching object can be increased.

Similarly, reference numerals 402a, 402b and 402c each denote the electrode line 402 shown in FIG. 16. The conductor lines 402a, 402b and 402c each correspond to an electrode of the capacitor to the ground. Likewise, reference numerals 403a, 403b and 403c each denote the electrode line 403 shown in FIG. 16. The conductor lines 403a, 403b and 403c each correspond to an electrode of the capacitor to the ground.

In this embodiment, in the gaps between the spiral sheet coils 401a, 401b and 401c, no conductor lines each serving as an electrode of the capacitor to the ground is provided. By providing no conductor lines in these gaps, a coil impedance change caused by approach made by any of the gaps to an approaching object can be increased.

The spiral sheet coil 401a forms the coil 211 shown in FIG. 12 whereas the conductor lines 402a and 403a form the electrodes of the capacitor 214 shown in the same figure, and their output voltage Vo is supplied to a first discriminator circuit 3. Similarly, the spiral sheet coil 401b forms another coil 211 whereas the conductor lines 402b and 403b form the electrodes of another capacitor 214, and their output voltage Vo is supplied to a second discriminator circuit 3. In the same way, the spiral sheet coil 401c forms a further coil 211 whereas the conductor lines 402c and 403c form the electrodes of a further capacitor 214, and their output voltage Vo is supplied to a third discriminator circuit 3.

As is obvious from the above, as many discriminator circuits 3 as spiral sheet coils 401 are provided, where j=a, b, c and so on, as discriminator circuits for evaluating supplied output voltages Vo. By providing such a configuration, a change in coil impedance and a change in electrostatic capacitance Co, which are caused by approach to an approaching object, can be increased so that the sensitivity can be improved.

In addition, a piece of metal body or a pedestrian can be recognized as an approaching object by determining the position of the approaching object in the transversal direction based on a recognized coil position. Of course, the number of sets each comprising the spiral sheet coil 401, the electrode lines 402 and 403, and the discriminator circuit 3 can be appropriately selected.

In addition, the flexible printed wiring board 400 can be provided on the back bumper instead of the front bumper or provided on the side face of the vehicle body. When the flexible printed wiring board 400 is provided on the side face of the vehicle body, the spiral sheet coils are arranged in the longitudinal direction of the vehicle.

It is preferable to set the directions of magnetic fields generated by two mutually close or adjacent spiral sheet coils 401 in directions opposite to each other. By setting the directions in this way, the sensitivity can be improved. The alternating current power supply 1 and the discriminator circuit 3, which are shown in FIG. 12, can be mounted on the flexible printed wiring board 400. In this case, since the lengths of wires connecting the alternating current power supply 1, the discriminator circuit 3, and the spiral sheet coil 401 can be reduced, voltage drops along the wires, superposed electromagnetic noises, and resistance noises can be decreased.

It is preferable to cover each of these wires with a metallic line serving as a magnetic shield. Of course, the spiral sheet coils 401 can also be made individually. As an alternative, a coil conductor can also be finely wound around a resin bobbin having a small axial direction length to make a coil 211.

It is to be noted that, a configuration in which the spiral sheet coil or a sheet coil is held by the bumper, fixed on the bumper or integrated with the bumper is particularly effective for improving the sensitivity even in the electrical insulator of the coil since the bumper is made of neither a material incurring an eddy current loss nor a magnetic material causing a magnetic flux to stray.

Figure 18:
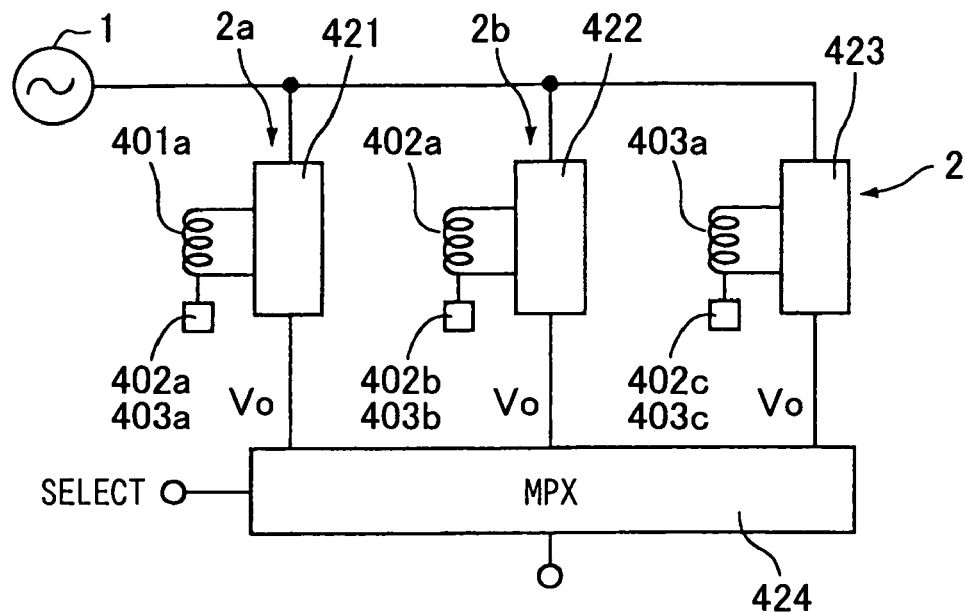
FIG. 18 is a circuit diagram showing a modification of the third embodiment of the present invention.

FIG. 18 shows a circuit for processing the output voltage Vo generated by each spiral sheet coil 401 shown in FIG. 16. Reference numerals 421 to 423 denote capacitors 212 and 214 as well as resistors 213 and 22, which are shown in FIG. 12. In FIG. 12, the coil 211 serving as the spiral sheet coil forms a sensor unit in conjunction with its capacitors 212 and 214 as well as resistors 213 and 22.

In the circuit shown in FIG. 18, the three output voltages Vo output individually by the sensor units are converted in a multiplexer 424 into a time multiplex signal to be processed by the discriminator circuit 3 shown in FIG. 12. The multiplexer 424 selects one of the output voltages Vo identified by a select signal. The sensor units receive power from the common alternating current power supply 1. By providing power to the sensor units from the common alternating current power supply 1, the circuit configuration of the alternating current power supply 1 and the discriminator circuit 3 can be made simple.

Instead of multiplexing output signals output by a plurality of sensor units by using the multiplexer and processing the output of the multiplexer in the common discriminator circuit 3, the voltage output by each of the sensor units can also be amplified by an amplifier before being subjected to an analog addition process or a digital addition process to produce a time multiplex signal.

In this case, however, control is executed to apply the alternating current voltage Vi generated by the alternating current power supply 1 to the sensor units sequentially one sensor unit after another. By sequentially applying the alternating current voltage Vi in this way, the circuit configuration can be made simple.

[Fourth Embodiment]

This embodiment compensates the coil 211 for changes in its electrical resistance, which is referred to hereafter as a coil resistance. The changes in coil resistance are caused by changes in temperature. A result of an experiment indicates that, the smaller the coil resistance, the more preferable the coil 211. For a large coil resistance, changes in coil resistance, which are caused by variations in temperature, change the output voltage Vo, lowering object differentiation precision.

Figure 19:
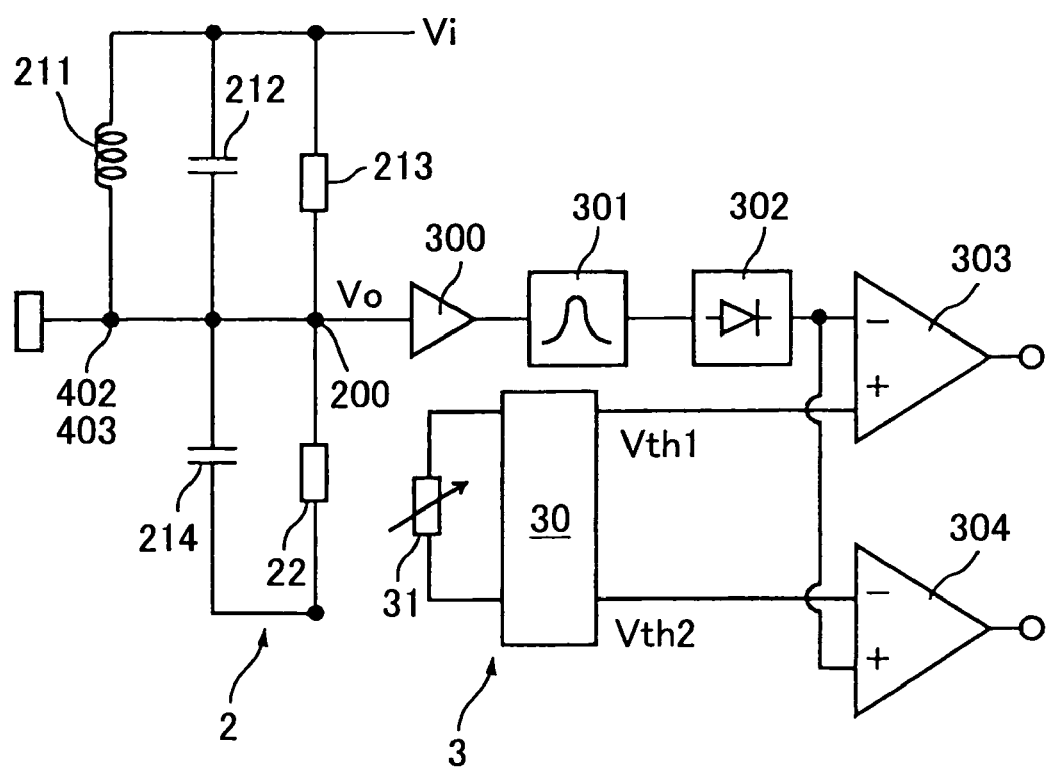
FIG. 19 is a circuit diagram showing a fourth embodiment of the present invention.

In the circuit shown in FIG. 19, the circuit configuration itself of the discriminator circuit 3 for processing the output voltage Vo generated by the sensor unit 2 is the same as that shown in FIG. 12. However, the discriminator circuit 3 employed in the circuit shown in FIG. 19 additionally includes a thermistor 31 and a threshold voltage generation circuit 30 for outputting threshold voltages Vth1 and Vth2 interlocked with a voltage drop along the thermistor 31 receiving power from a constant current source.

The threshold voltage generation circuit 30 outputs the threshold voltages Vth1 and Vth2 to comparators 303 and 304. The threshold voltages Vth1 and Vth2 change in accordance with variations in voltage drop, which are caused by changes in temperature in the thermistor 31. Of course, the threshold voltage generation circuit 30 changes the output voltage Vo in accordance with variations in voltage drop along the thermistor 31, which are caused by changes in temperature, in a direction restricting the variations in output voltage Vo from lowering the differentiation precision. The variations in output voltage Vo themselves are caused by changes in coil resistance in the coil 211, which are attributed to changes in temperature.

By compensating the coil 211 for changes in coil resistance in this way, the differentiation precision can be prevented from lowering due to changes in coil resistance in the coil 211, which are attributed to changes in temperature.

It is to be noted that, instead of changing the threshold voltages Vth1 and Vth2 supplied to the comparators 303 and 304 respectively, the amplification factor of an amplifier 300 and the output voltage Vi generated by the alternating current power supply 1 can be changed in accordance with a voltage drop along the thermistor 31.

In addition, in place of the thermistor 31, a variety of circuits each used for generating an output interlocked with the temperature can be employed. As an alternative, the output voltage generated by the detection/smoothing circuit 302 is converted into a digital signal supplied to a microcomputer for carrying out an equivalent temperature compensation process by execution of software.

Figure 20:
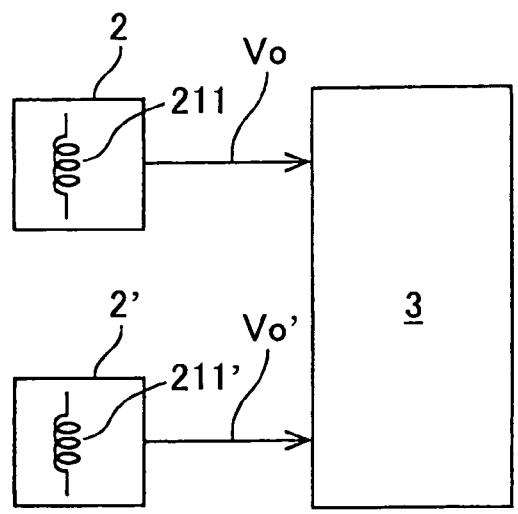
FIG. 20 is a circuit diagram showing a modification of the fourth embodiment of the present invention.

As a modification of the fourth embodiment, a pseudo sensor unit 2' equivalent to the sensor unit 2 can be provided as shown in FIG. 20.

The pseudo sensor unit 2' has the same circuit configuration as the sensor unit 2 shown in FIG. 19. It is assumed, however, that the pseudo sensor unit 2', the dummy coil 211' and the capacitor to the ground are magnetically shielded so that they always have their respective circuit constants corresponding to a state in which no object is approaching the sensor unit 2 shown in FIG. 19.

Since the capacitor to the ground is a capacitor corresponding to the capacitor represented by the equivalent capacitor 214 in FIG. 19, the capacitor to the ground is not shown in the figure. The dummy coil 211' embedded in the pseudo sensor unit 2' is assumed to have a temperature resistance change rate equal to the coil 211 employed in the sensor unit 2.

By having the above configuration, the output voltage Vo' generated by the pseudo sensor unit 2' is always the same as an output voltage Vo1 for a case in which there is no approaching object. Thus, when the output voltage Vo generated by the sensor unit 2 is lower than the output voltage Vo' generated by the pseudo sensor unit 2' by at least a difference of a predetermined level, the approach can be determined to be an approach of a pedestrian. When the output voltage Vo generated by the sensor unit 2 is higher than the output voltage Vo' generated by the pseudo sensor unit 2' by at least a difference of another predetermined level, on the other hand, the approach can be determined to be approach of a metallic body. Thus, an effect of the coil resistance of the coil 211 varying due to the temperature can be avoided.

It is to be noted that, one of a plurality of sensor units employed in the circuit shown in FIG. 18 can be selected to be used as the pseudo sensor unit 2'. The selected sensor unit is a sensor unit having a similar circuit constant. In this case, it is preferable to select a sensor unit provided at a location separated from the sensor unit 2 as the pseudo sensor unit 2'. By selecting such a sensor unit, the probability that objects of the same type are approaching at the same time by the sensor units 2 and 2' separated from each other is low.

Figure 21:
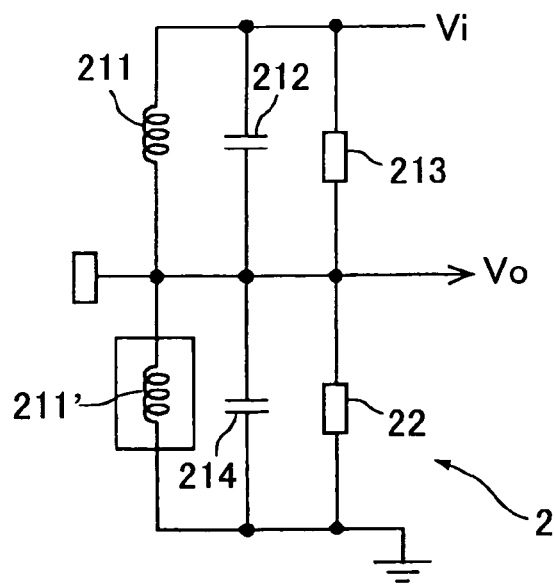
FIG. 21 is a circuit diagram showing the modification shown in FIG. 20.

As another configuration, as shown in FIG. 21, a dummy coil 211' having a resistance value and a resistance temperature coefficient, which are equal to those of the coil 211, can be connected in parallel to the capacitor 214 in the sensor unit 2 shown in FIG. 12. It is preferable to provide a configuration, in which the capacitors 212 and 214 have equal electrostatic capacitances, resistors 213 and 22 have equal resistances and the dummy coil 211' has a coil impedance equal to the coil impedance of the coil 211, for a case of facing no approaching object.

However, the dummy coil 211' is magnetically shielded so that the coil impedance of the dummy coil 211' does not change due to an approaching object. In addition, the dummy coil 211' is set to have a resistance temperature change rate equal to that of the coil 211. By setting the dummy coil 211' in this way, variations in output voltage Vo, which are caused by changes of the resistance of the coil 211 due to changes in temperature, mutually cancel variations in output voltage Vo, which are caused by changes of the resistance of the dummy coil 211' due to changes in temperature. Thus, a differentiation process can be carried out precisely. It is to be noted that the dummy coil 211' can be implemented as a non-inductive coil or a resistor.

[Fifth Embodiment]

In this embodiment, a plurality of sensor units 2 is arranged at positions adjacent to each other into an array as shown in FIG. 18, and alternating current voltages Via, Vib, and Vic having frequencies different from each other are applied to the sensor units 2.

Figure 22:
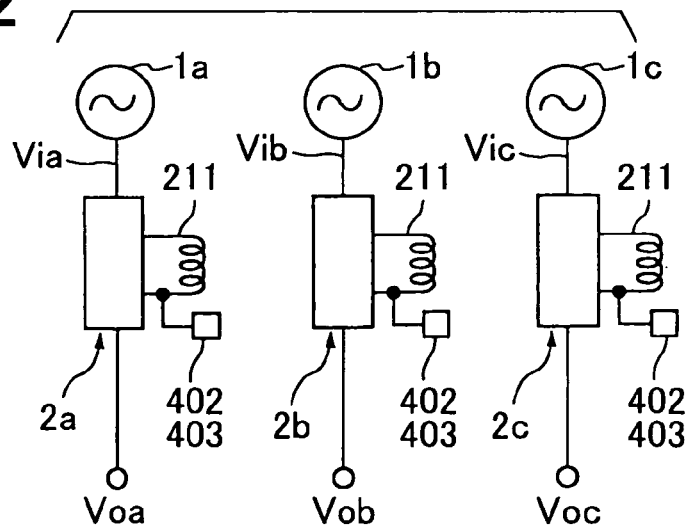
FIG. 22 is a circuit diagram showing a fifth embodiment of the present invention.

In FIG. 22, reference numerals 1a, 1b and 1c denote generators for generating respectively the alternating current voltages Via, Vib and Vic individually at different frequencies. The alternating current voltages Via, Vib and Vic are each referred to hereafter as an alternating current voltage Vi when there is no need to differentiate them from each other. The alternating current voltages Via, Vib and Vic are applied to the sensor units 2a, 2b and 2c, respectively.

The sensor units 2a, 2b and 2c generate output voltages Voa, Vob and Voc respectively, which are processed separately by different discriminator circuits 3. Of course, the band pass filter embedded in each of the discriminator circuits 3 extracts only frequency components of the output voltage as components to be processed by the discriminator circuit 3. By doing so, an effect of changes in current flowing into an adjacent coil 211 can be reduced. Thus, the differentiation precision and the precision to determine a left or right position or a front or rear position of the approaching object can be improved.

[Sixth Embodiment]

Figure 23:
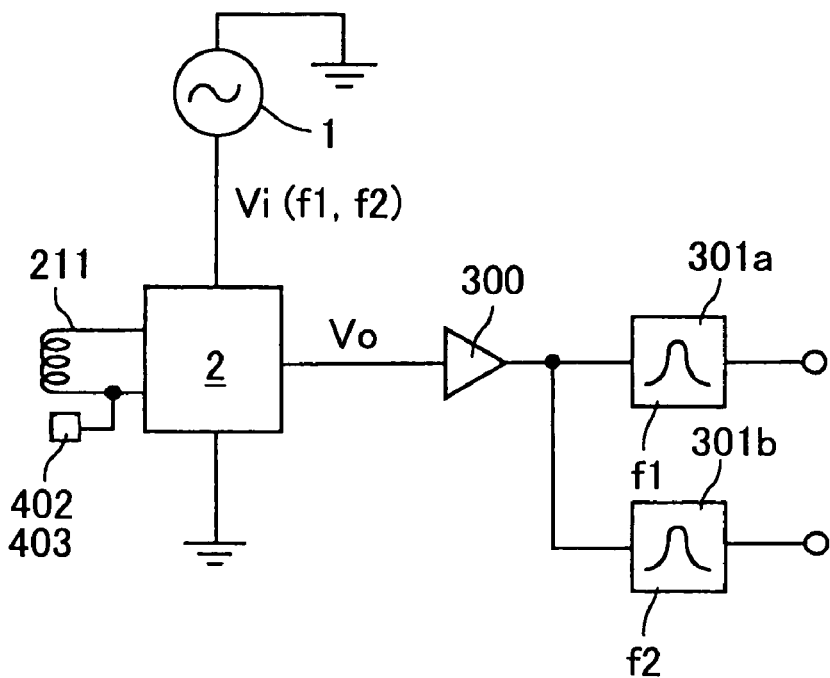
FIG. 23 is a circuit diagram showing a sixth embodiment of the present invention.

This embodiment is characterized in that, as shown in FIG. 23, an alternating current voltage of combined sinusoidal voltages having two frequencies f1 and f2 is applied to one sensor unit 2 employed in the circuit shown in FIG. 12. A voltage output by the first stage amplifier 300 is supplied to two band pass filters 301a and 301b. The band pass filter 301a extracts an alternating current voltage having the frequency f1 and the band pass filter 301b extracts an alternating current voltage having the frequency f2.

In addition, the alternating current power supply 1 may also combine sinusoidal voltages with different frequencies and output the combined voltage. The alternating current voltages output by the band pass filters are detected and smoothed before being processed in comparators each generating a digital signal, which can then be processed by a microcomputer.

As shown in FIG. 15, the change in output voltage Vo from a reference due to approach of a human body is opposite to the change in output voltage Vo from the same reference due to approach of a metallic body in a band area of frequencies lower than the frequency fo2 and a band area of frequencies higher than the frequency fo1 where the reference is a characteristic curve for a case of facing no approaching object.

It is assumed that the frequency f1 is a predetermined value lower than the frequency fo2 and the frequency f2 is a predetermined value higher than the frequency fo2. By setting the frequencies f1 and f2 at such values, one sensor unit 2 is capable of producing two signals. Thus, by adding a detected and smoothed voltage of the alternating current voltage output by the band pass filter 301a at the frequency f1 after being inverted to a detected and smoothed voltage of the alternating current voltage output by the band pass filter 301b at the frequency f2, the differentiation precision can be further improved.

As an alternative, the frequencies f1 and f2 can both be set at values between the frequencies fo1 and fo2. In this case, by adding a detected and smoothed voltage of the alternating current voltage output by the band pass filter 301a at the frequency f1 as it is to a detected and smoothed voltage of the alternating current voltage output by the band pass filter 301b at the frequency f2, the differentiation precision can be further improved. This is because, due to the addition, noise powers of typically resistance noises combined with the powers of the two signals become about 1.4 times, which are smaller than two times.

In addition, when a plurality of alternating current voltages is obtained, a plurality of values each expressed by Eq. (1) is also obtained from each frequency. Thus, by using each of them, L or Co can be computed directly.

[Seventh Embodiment]

In this embodiment, for each of a plurality of sensor units 2a, 2b and 2c arranged at positions adjacent to each other in the transversal direction of the vehicle shown in FIGS. 17 and 18, the capacitors 212 and 214 as well as the resistors 213 and 22, which are shown in FIG. 12, are adjusted to set the frequency fo1 at a value uniform for the sensor units 2a, 2b and 2c and the frequency fo2 at a value uniform for the sensor units 2a, 2b and 2c.

The parasitic electrostatic capacitances of the sensor units 2a, 2b and 2c are different from each other due to different installation locations of the sensor units 2a, 2b and 2c on the vehicle body. Similarly, the inductance of the coil 401a employed in the sensor unit 2a, the inductance of the coil 401b employed in the sensor unit 2b, and the inductance of the coil 401c employed in the sensor unit 2c are also different from each other for the same reason.

Variations of the frequencies fo1 and fo2 due to the differences can be reduced by adjusting the capacitances of the external capacitors 212 and 214. Thus, even when the sensor units 2a, 2b, and 2c are installed at locations different from each other, their frequencies fo1 can be made uniform. Similarly, their frequencies fo2 can also be made uniform as well. As a result, signal processing can be carried out in discriminator circuits 3 employing band pass filters having the same passing frequency by making the output frequencies of the alternating current power supplies uniform so that the differentiation precision can be improved even when multiplexer processing is performed.

In a modification of the seventh embodiment, voltages optimum for the sensor units 2a, 2b and 2c are applied individually from different alternating current power supplies to the sensor units 2a, 2b and 2c, which have different frequencies fo1 and different frequencies fo2. In this case, the passing frequencies of the band pass filters 301 embedded in the discriminator circuits 3 for individually processing output voltages Vo to be eventually generated by the sensor units are set at different values.

[Eighth Embodiment]

Figure 24:
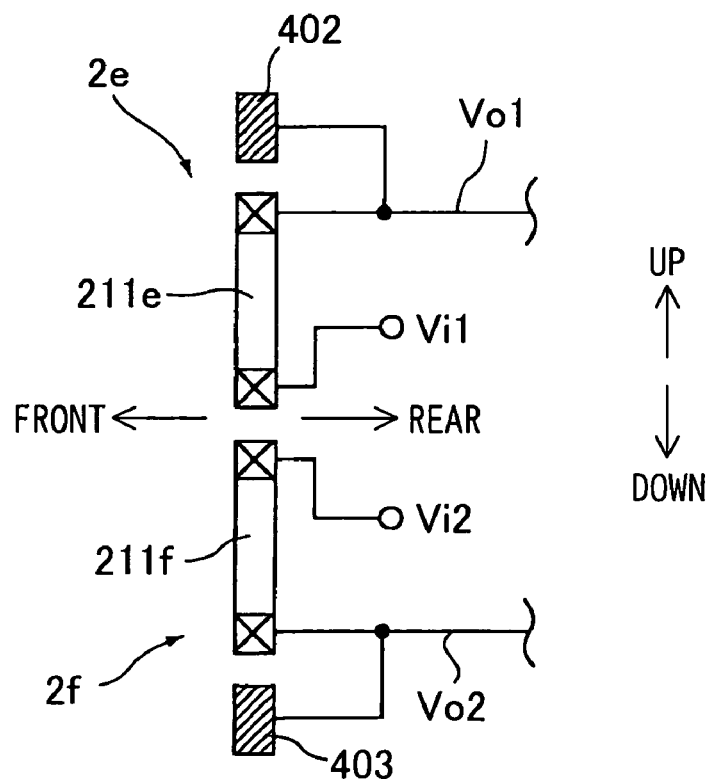
FIG. 24 is a circuit diagram showing an eighth embodiment of the present invention.

In this embodiment, as shown in FIG. 24, a coil 211e is provided on the upper half of the rear face of the bumper 4 and a coil 211f is provided on the lower half of the rear face of the bumper 4. In addition, an electrode line 402 is provided above the coil 211e and an electrode line 403 is provided beneath the coil 211f. Thus, the coil 211e and the electrode line 402 function as circuit devices of a sensor unit 2e on the upper side. On the other hand, the coil 211f and the electrode line 403 function as circuit devices of a sensor unit 2f on the lower side. In such a configuration, by comparing the output voltage Vo1 generated by the sensor unit 2e on the upper side with the output voltage Vo2 generated by the sensor unit 2f on the lower side, the position of an approaching object in the height direction can be determined.

In the case of a metallic body provided on a road as is the case with a railroad, for example, the metal detection level of the sensor unit 2f on the lower side is much higher than the metal detection level of the sensor unit 2e on the upper side. In this case, the approaching object is determined to be a rail and is not regarded as an object.

It is to be noted that, in this case, the frequency of the alternating current voltage Vi2 applied to the sensor unit 2f on the lower side may be set at a value equal to or different from the frequency of the alternating current voltage Vi1 applied to the sensor unit 2e on the upper side. As an alternative, the alternating current voltage Vi1 can also be applied to the sensor unit 2e on the upper side and the sensor unit 2f on the lower side sequentially one after another.

When the frequency of the alternating current voltage Vi applied to the sensor unit 2f on the lower side is set at a value equal to the frequency of the alternating current voltage Vi applied to the sensor unit 2e on the upper side, the direction of the generation of a magnetic field in the coil 211e on the upper side is opposite to the direction of the generation of a magnetic field in the coil 211f on the lower side.

This configuration is preferable in that the detection sensitivity is improved. When a difference between the output voltage Vo1 generated by the sensor unit 2e on the upper side and the output voltage Vo2 generated by the sensor unit 2f on the lower side is small, the sum of both of the output voltages Vo1 and Vo2 is taken for use in the differentiation of a metallic body and a pedestrian from each other so as to improve the S/N ratio.

[Ninth Embodiment]

Figure 25:
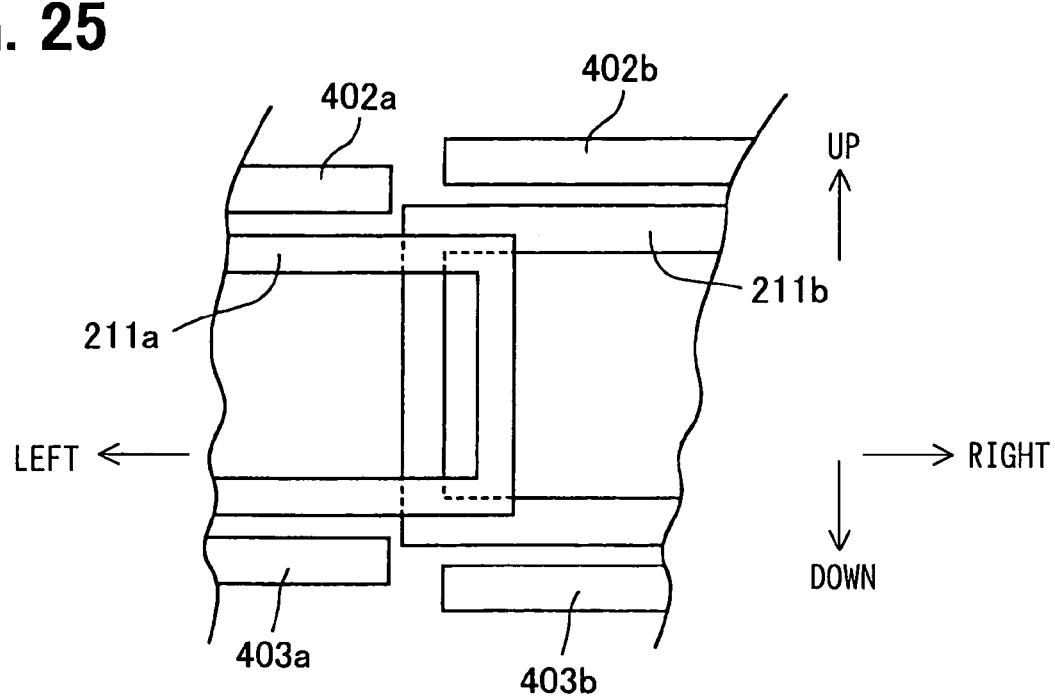
FIG. 25 is a schematic diagram showing a front view of a state of installation of a sensor implemented by a ninth embodiment of the present invention.

In this embodiment shown in FIG. 25, a short side of a coil 211a overlaps a short side of a coil 211b, which is adjacent to the coil 211a in the transversal direction of the vehicle. When the boundary between the two coils 211a and 211b approaches an approaching object in such a configuration, the two coils 211a and 211b are capable of detecting the approaching object with a high sensitivity. Thus, when both the two coils 211a and 211b generate large changes in output in the same direction, it is possible to determine whether the approaching object has a large size in the transversal direction of the vehicle or the boundary between the two coils 211a and 211b is approaching the approaching object.

It is to be noted that alternating current voltages Vi having the same or different frequencies can be applied to the two coils 211a and 211b. As an alternative, an alternating current voltage Vi can be applied to the two coils 211a and 211b sequentially one coil after another.

It is preferable to apply alternating current voltages Vi having the same frequency to the two coils 211a and 211b at the same time. Because, by applying alternating current voltages Vi having the same frequency to the two coils 211a and 211b at the same time, the direction of the generation of a flux in the specific one of the coils 211a and 211b is the same as the direction of the generation of a flux in the other coil adjacent to the specific coil.

Also in this case, the two coils 211a and 211b are capable of detecting the approaching object with a high sensitivity. Thus, when both the two coils 211a and 211b generate large changes in output in the same direction, it is possible to determine whether the approaching object has a large size in the transversal direction of the vehicle or the boundary between the two coils 211a and 211b is approaching the approaching object.

It is to be noted that alternating current voltages Vi having the same or different frequencies can be applied to the two coils 211a and 211b. As an alternative, an alternating current voltage Vi can be applied to the two coils 211a and 211b sequentially one coil after another. It is preferable to apply alternating current voltages Vi having the same frequency to the two coils 211a and 211b at the same time. Because, by applying alternating current voltages Vi having the same frequency to the two coils 211a and 211b at the same time, the direction of the generation of a flux in the specific one of the coils 211a and 211b is the same as the direction of the generation of a flux in the other coil adjacent to the specific coil.

[Tenth Embodiment]

Figure 26:
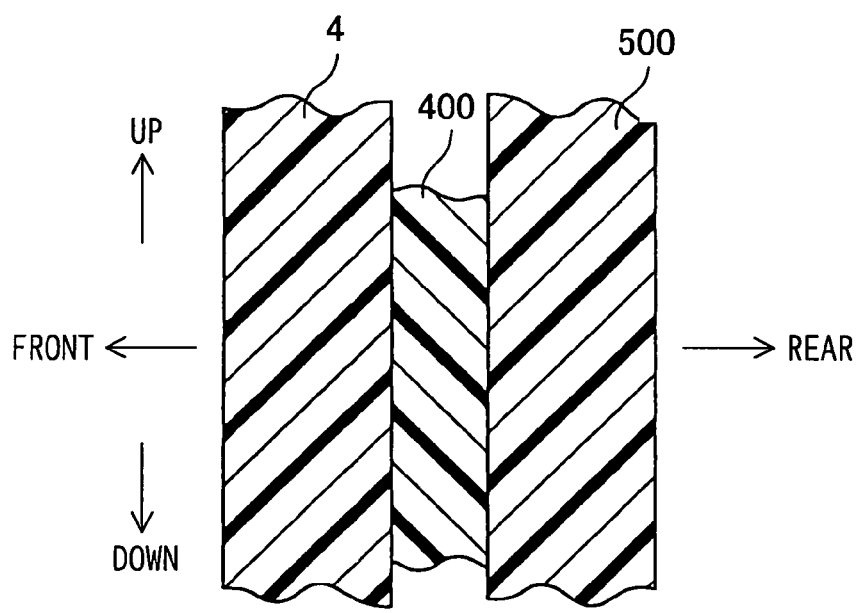
FIG. 26 is a schematic diagram showing a cross section of a state of installation of a sensor implemented by a tenth embodiment of the present invention.

This embodiment is characterized in that, as shown in FIG. 26, a flexible printed wiring board 400 for mounting the spiral sheet coil and the electrodes of a capacitor to the ground is accommodated between the back face of the bumper 4 and a fixed plate (a pressing plate) 5 as shown in FIG. 26. The spiral sheet coil and the electrodes of a capacitor to the ground themselves are not shown in the figure. In such a configuration, the back face of the bumper 4 covers the flexible printed wiring board 400 so that the protection of the flexible printed wiring board 400 is enhanced.

It is to be noted that the fixed plate 500 is a non-magnetic and electrically insulating resin member having stiffness tolerating the deformability of the bumper 4. The fixed plate 500 is fixed on the back face of the bumper 4. It is preferable to provide a fixed plate 500 having a rib on the edges of the fixed plate 500 on the back face of the flexible printed wiring board 400 as a rib surrounding the flexible printed wiring board 400 and to typically engage the rib with the back face of the bumper 4 so as to support the fixed plate 500 on back face of the bumper 4.

By having such a configuration, a gap is ensured between the bumper 4 and the fixed plate 500 as a gap for allowing the flexible printed wiring board 400 accommodated between the back face of the bumper 4 and a fixed plate 500 to move in the longitudinal direction of the vehicle. Thus, even when the bumper 4 is dented locally by any possibility, the flexible printed wiring board 400 can also be deformed to keep up with the dent and prevent the coil 211 mounted on the flexible printed wiring board 400 from being damaged. It is preferable to provide a fixed plate 500 having flexibility at least equivalent to that of the bumper 4.

Figure 27A:
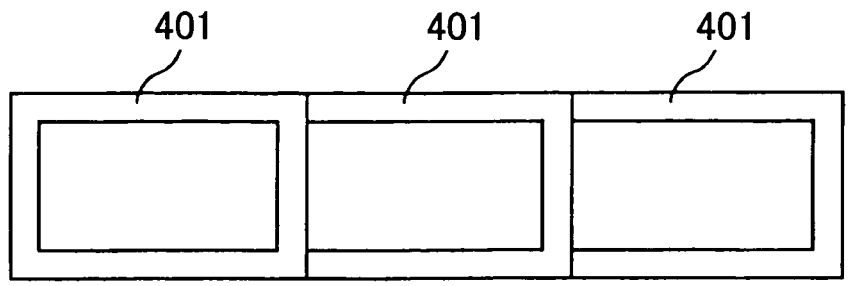
FIGS. 27A and 27B are schematic diagrams showing an analysis model according to a modification of the tenth embodiment shown in FIG. 26.
Figure 27B:
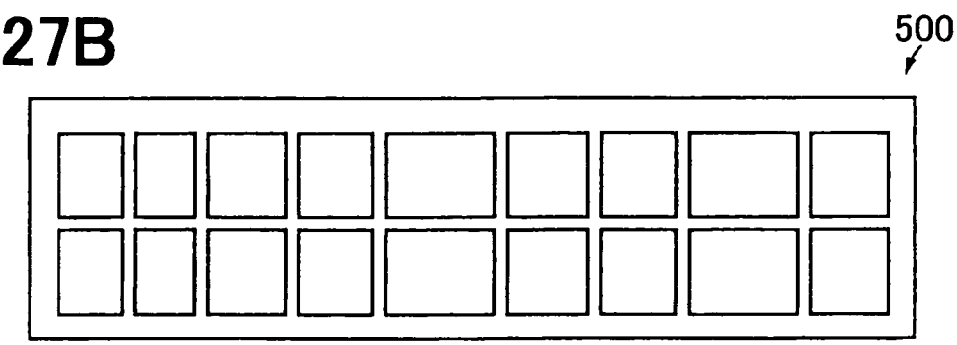

FIGS. 27A and 27B are diagrams showing a modification of the tenth embodiment as a model dividing the embodiment into three spiral sheet coils 401 and the fixed plate 500. In this configuration, the fixed plate (pressing plate) 5 shown in FIG. 26 is made of resin and formed into a mesh shape. By forming the pressing plate 500 in this way, the sheet coil can be prevented from losing its mobility due to ground and sands, which are blocking the surroundings of the coil after muddy water or the like introduced into a space between the flexible printed wiring board 400 holding the coil and the fixed plate 500 dries.

It is to be noted that a large number of holes penetrates members included in the flexible printed wiring board 400 as members on which no sheet coils 401 are formed so that, even when muddy water is introduced into a space between the flexible printed wiring board 400 and the bumper 4, the water can be discharged with ease through the holes penetrating the flexible printed wiring board 400 and an opening of the fixed plate 500. Of course, a cover can be provided as a cover for veiling the flexible printed wiring board 400 and the fixed plate 500.

Figure 28A:
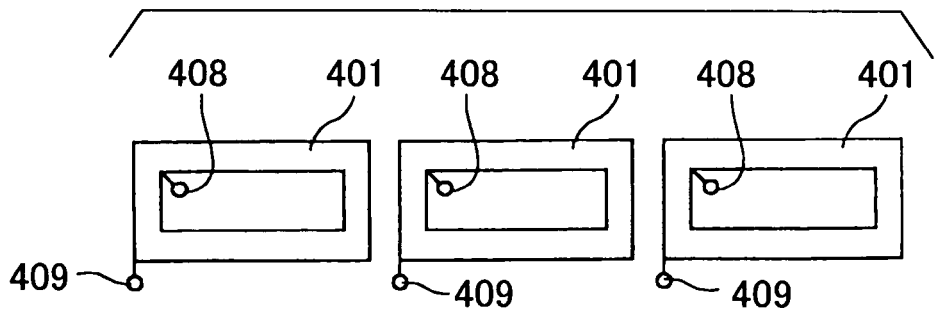
FIGS. 28A and 28B are schematic diagrams showing another analysis model showing another modification of the tenth embodiment shown in FIG. 26.
Figure 28B:
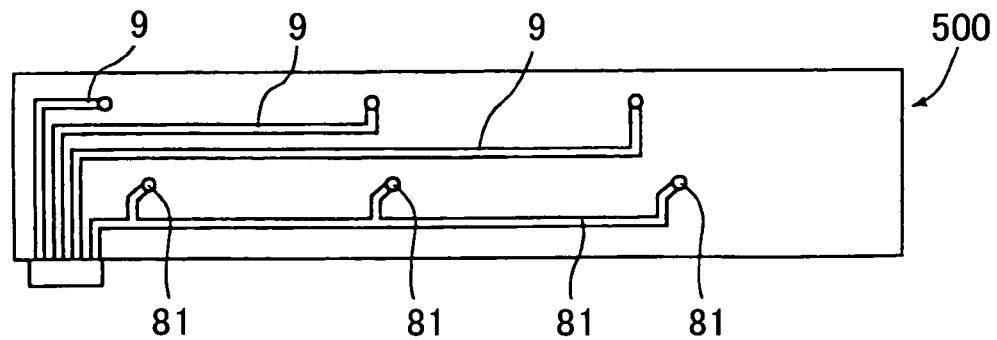

FIGS. 28A and 28B are diagrams showing a model dividing the tenth embodiment into three spiral sheet coils 401 and the fixed plate 500. In this configuration, a power supplying wire 8 and three output signal lines 9 are created on the fixed plate (pressing plate) 5 shown in FIG. 26 as a plate made of resin. The power supplying line 8 is a wire for supplying power to the spiral sheet coils 401. On the other hand, the output signal lines 9 are each a wire for reading out a signal from one of the spiral sheet coils 401.

The innermost terminal 408 of each of the spiral sheet coils 401 is connected to a terminal 81 of the power supplying line 8. On the other hand, The outermost terminal 409 of each of the spiral sheet coils 401 is connected to an end of an output signal line 9. The terminals of the spiral sheet coils 401 are connected to the ends of the lines 8 and/or 9 by soldering or by using connectors allowing the terminals to be disconnected from the ends. By connecting the terminals of the spiral sheet coils 401 to the ends of the wires in this way, the wiring to the spiral sheet coils 401 can be simplified and the spiral sheet coils 401 can also be mounted on a flexible printed wiring board having a simple configuration.

In the embodiments described above, it is preferable to install the coil 211 with its central axis oriented in the approximately horizontal direction and in a direction about perpendicular to a coil installation portion on the vehicle. In addition, an approximately rectangular and flat sheet coil provided about horizontally on the front or rear face of the vehicle with its long sides oriented in the transversal direction of the vehicle or provided about horizontally on the side face of the vehicle with its long sides oriented in the longitudinal direction of the vehicle is specially effective for improving the sensitivity of detection of an approaching object.

In particular, since a flat sheet coil can be embedded in a bumper or a resin mold with ease, the beautiful appearance of the car is by no means lost. In addition, the flat sheet coil can be manufactured at a very low cost in comparison with the conventional ultrasonic wave system and is capable of monitoring a wide range of surroundings of a vehicle with ease in a non-contact way.

In addition, it is preferable to set the widths of the electrode lines 402 and 403 serving as the electrodes of the capacitor to the ground at a value greater than the outermost turn width of the sheet coils. Furthermore, it is preferable to form the outermost turn of each spiral sheet coil at a width greater than other turns.

The present invention should not be limited to the disclosed embodiments and modifications and may be implemented in many other ways without departing from the spirit of the invention.

What is claimed is:

1. A detection apparatus for detecting an approaching object, comprising:
    a coil provided on a surface of a vehicle, having its own coil impedance changed by approach made by a metallic body serving as an approaching object to the vicinity of the vehicle, the coil being arranged to generate a magnetic field around the vehicle when supplied with power;
    an alternating current power supply for supplying alternating current power to the coil, so that the coil generates an alternating current magnetic field; and
    a discriminator electrically connected to the coil for recognizing approach made by the metallic body based on an electrical quantity related to a change exhibited by the coil impedance as a change attributed to an eddy current flowing in the metallic body in response to the alternating current magnetic field.

2. The detection apparatus as in claim 1, further comprising:

a to-the-ground capacitor having an electrode provided at a location adjacent to the coil on a surface of the vehicle to change a to-the-ground capacitance thereof changeable with approach by a pedestrian as an approaching object to the vicinity of the vehicle, wherein the discriminator determines whether the approaching object is the metallic body or the pedestrian based on an electrical quantity related to a change in the coil impedance and an electrical quantity related to a change in the to-the-ground capacitance.

3. The detection apparatus as in claim 2, wherein:

the coil has one end that receives power from one of terminals of the alternating current power supply, the other terminal of which is connected to the ground;

the coil has another end that is connected to the electrode of the to-the-ground capacitor to function as a detection terminal for detecting the electrical quantities; and the discriminator detects a voltage increase at the detection terminal as approach made by the metallic body and a voltage decrease at the detection terminal as approach made by the pedestrian.

4. The detection apparatus as in claim 3, wherein a turn forming the another end of the coil essentially also serves as the electrode of the to-the-ground capacitor.

5. The detection apparatus as in claim 3, further comprising:

a parallel connection capacitor, which has an electrostatic capacitance and is connected in parallel to the coil, wherein a frequency of the power supply is set at a mid value between a first frequency and a second frequency, the first frequency frc being a frequency at which $\omega C$ is equal to $1/(\omega L)$ and the second frequency being a frequency at which $\omega(C+Co)$ is equal to $1/(\omega L)$, under a condition that L is inductance of the coil and $\omega$ is a quantity equal to $2\pi f$.

6. The detection apparatus as in claim 1, wherein:

the coil is arranged at least a plurality of locations on a front or rear face of the vehicle to form an array in a transversal direction of the vehicle;

the discriminator detects an electrical quantity related to a change in the coil impedance or the electrical quantity related to a change in to-the-ground capacitance for each coil; and a position of the approaching object in a transversal direction of the vehicle is determined based on the detection results.

7. The detection apparatus as in claim 6, wherein:

each coil receives power from the alternating current power supply; and the discriminator has a multiplexer for sequentially selecting electrical quantities each related to the coil impedance at successive times.

8. The detection apparatus as in claim 1, further comprising:

a compensation circuit for compensating for changes exhibited by the electrical quantity related to the coil impedance caused by temperature changes by an electrical resistance of the coil.

9. The detection apparatus as in claim 1, further comprising:

a dummy coil connected in parallel to a parallel connection capacitor and magnetically shielded against the approaching object, wherein the dummy coil has a coil impedance approximately equal to the coil impedance of the coil in a state of no approaching object, and has a rate of temperature-resistance change approximately equal to that of the coil, and wherein the electrostatic capacitance is about equal to the to-the-ground capacitance of the to-the-ground capacitor in the state of no approaching object.

10. The detection apparatus as in claim 1, wherein:

the alternating current power supply supplies an alternating current voltage having a plurality of frequencies to the coil; and the discriminator processes the electrical quantities for each of the frequencies.

11. A detection apparatus for detecting an approaching object, comprising:

a coil provided on a surface of a vehicle and having a coil impedance changeable by approach of a metallic body as an approaching object to the vicinity of the vehicle, the coil being arranged to generate a magnetic field around the vehicle when supplied with power;

an alternating current power supply for supplying alternating current power to the coil, so that the coil generates an alternating current magnetic field; and a discriminator electrically connected to the coil for recognizing approach of the metallic body based on an electrical quantity related to a change in the coil impedance, wherein the coil is an approximately rectangular flat sheet coil having a coil central axis set in an approximately horizontal direction and in a direction approximately perpendicular to a coil-setting portion of the vehicle as well as a long side laid about horizontally on a front or rear face of the vehicle in the transversal direction of the vehicle or provided about horizontally on any of the side faces of the vehicle in the longitudinal direction of the vehicle.

12. The detection apparatus as in claim 11, wherein the sheet coil is the spiral sheet coil having a turn conductor of an eddy shape.

13. The detection apparatus as in claim 11, further comprising:

a to-the-ground capacitor having an electrode provided at a location adjacent to the sheet coil on the surface of the vehicle and having a to-the-ground capacitance thereof changeable by approach of a pedestrian as the approaching object to the vicinity of the vehicle;

wherein the discriminator determines whether the approaching object is a metallic body or a pedestrian based on an electrical quantity related to a change in the coil impedance and an electrical quantity related to a change in the to-the-ground capacitance.

14. The detection apparatus as in claim 13, wherein:

the sheet coil has one end that receives power from one of terminals of the alternating current power supply, another terminal of which is connected to the ground;

the sheet coil has another end connected to an electrode of the to-the-ground capacitor to function as a detection terminal for detecting the electrical quantities; and the discriminator detects a voltage increase at the detection terminal as approach made by the metallic body and a voltage decrease at the detection terminal as approach made by the pedestrian.

15. The detection apparatus as in claim 11, wherein:

the sheet coil is arranged at a plurality of locations on at least on the front or rear face of the vehicle to form upper and lower arrays adjacent to each other; and the discriminator discriminates between a low-altitude metallic body having a small height serving as no object to a running state of the vehicle and a high-altitude metallic body having a big height serving as an object to a running state of the vehicle based on the electrical quantity related to a change in coil impedance for each sheet coil.

16. The detection apparatus as in claim 15, wherein:
the alternating current power supply supplies an alternating current voltage having a plurality of frequencies to the sheet coils; and
the discriminator extracts for each sheet coil, only a frequency component corresponding to one of the frequencies, which is assigned to the sheet coil, and treats the extracted frequency component as the electrical quantity.

17. The detection apparatus as in claim 15, wherein each sheet coil is created so that magnetic flux generation direction is opposite to each other.

18. The detection apparatus as in claim 11, wherein:
each sheet coil is arranged at a plurality of mutually close or adjacent locations on the front or rear face of the vehicle in the transversal direction of the vehicle or any of the side faces of the vehicle in the longitudinal direction of the vehicle; and
the discriminator detects the electrical quantity related to the change in the coil impedance or the electrical quantity related to the change in the to-the-ground capacitance for each sheet coil.

19. The detection apparatus as in claim 18, wherein the discriminator circuit determines a position of the approaching object in the transversal direction of the vehicle based on the detection results.

20. The detection apparatus as in claim 18, wherein:
each sheet coil receives power of a frequency different from that of another sheet coil arranged close or adjacent to the each sheet coil; and
the discriminator extracts, for each sheet coil, only a frequency component corresponding to one of the frequencies, which is assigned to the sheet coil, and treats the extracted frequency component as the electrical quantity.

21. The detection apparatus as in claim 18, wherein magnetic flux generation direction of the sheet coil is opposite to that of another sheet coil provided close or adjacent to the sheet coil.

22. The detection apparatus as in claim 18, wherein the sheet coil has a short side overlapping each other with a short side of another sheet coil provided adjacently with neither a gap nor the electrode existing therebetween.

23. The detection apparatus as in claim 18, wherein the discriminator carries out a determination process by using a threshold value for the electrical quantity of a center sheet coil selected among the mutually close and adjacent sheet coils arranged in the transversal or longitudinal direction of the vehicle and another threshold value for the electrical quantity of an edge sheet coil selected among the adjacent sheet coils.

24. The detection apparatus as in claims 13, wherein the electrode of the to-the-ground capacitor is oriented in parallel to the long sides of the sheet coil at a location, which is adjacent to the sheet coil and above or under the sheet coil.

25. The detection apparatus as in claim 24, wherein the electrode is created with its width greater than the width of an outermost turn of the sheet coil.

26. The detection apparatus as in claim 24, wherein an outermost turn of the sheet coil is created with its width greater than the widths of other turns of the sheet coil.

27. The detection apparatus as in claim 11, wherein the sheet coil is fixed on a bumper made of resin or integrated with the bumper.

28. The detection apparatus as in claim 27, wherein the sheet coil has characteristics of being non-magnetic and having a large specific resistance and is accommodated between the bumper and a pressing plate provided on the back face of the bumper in such a way that the sheet coil can be displaced relatively to the bumper.

29. The detection apparatus as in claim 28, wherein the pressing plate is penetrated by a large number of holes in the thickness direction of the pressing plate.

30. The detection apparatus as in claim 29, wherein:
the pressing plate has a power supplying line for supplying power to the sheet coil and an output signal line for fetching an electric potential appearing at one end of the sheet coil; and
the power supplying line or the output signal line is connected to the end of the sheet coil.

31. The detection apparatus as in claim 28, wherein the pressing plate has flexibility at least equivalent to that of the bumper.

32. The detection apparatus as in claim 12, wherein the spiral sheet coil is formed by using a flexible printed wiring board.

33. The detection apparatus as in claim 32, wherein the discriminator is mounted on the flexible printed wiring board.

34. The detection apparatus as in claim 32, wherein a connection line laid on the flexible printed wiring board for connecting the discriminator circuit to the spiral sheet coil is magnetically shielded.

35. The detection apparatus as in claim 32, wherein:
the flexible printed wiring board has the sheet coil at a plurality of locations and arranged in the longitudinal or transversal direction of the vehicle; and
the discriminator detects an electrical quantity related to the change in coil impedance or the electrical quantity related to the change in to-the-ground capacitance for each sheet coil individually.

36. A detection apparatus for detecting an approaching object, comprising:
a coil provided on a surface of a vehicle, having its own coil impedance changed by approach made by a metallic body serving as an approaching object to the vicinity of the vehicle;
an alternating current power supply for supplying power to the coil;
a discriminator for recognizing approach made by the metallic body based on an electrical quantity related to a change exhibited by the coil impedance as a change attributed to an eddy current flowing in the metallic body; and
a to-the-ground capacitor having an electrode provided at a location adjacent to the coil on a surface of the vehicle to change a to-the-ground capacitance thereof changeable with approach by a pedestrian as an approaching object to the vicinity of the vehicle,
wherein the discriminator determines whether the approaching object is the metallic body or the pedestrian based on an electrical quantity related to a change in the coil impedance and an electrical quantity related to a change in the to-the-ground capacitance.

37. A detection apparatus for detecting an approaching object, comprising:

a coil provided on a surface of a vehicle, having its own coil impedance changed by approach made by a metallic body serving as an approaching object to the vicinity of the vehicle;

an alternating current power supply for supplying power to the coil;

a discriminator for recognizing approach made by the metallic body based on an electrical quantity related to a change exhibited by the coil impedance as a change attributed to an eddy current flowing in the metallic body; and a dummy coil connected in parallel to a parallel connection capacitor and magnetically shielded against the approaching object, wherein the dummy coil has a coil impedance approximately equal to the coil impedance of the coil in a state of no approaching object, and has a rate of temperature-resistance change approximately equal to that of the coil; and wherein the electrostatic capacitance is about equal to the to-the-ground capacitance of the to-the-ground capacitor in the state of no approaching object.

38. A detection apparatus for detecting an approaching object, comprising:

a coil provided on a surface of a vehicle and having a coil impedance changeable by approach of a metallic body as an approaching object to the vicinity of the vehicle;

an alternating current power supply for supplying power to the coil;

a discriminator for recognizing approach of the metallic body based on an electrical quantity related to a change in the coil impedance, wherein the coil is an approximately rectangular flat sheet coil having a coil central axis set in an approximately horizontal direction and in a direction approximately perpendicular to a coil-setting portion of the vehicle as well as a long side laid about horizontally on a front or rear face of the vehicle in the transversal direction of the vehicle or provided about horizontally on any of the side faces of the vehicle in the longitudinal direction of the vehicle; and a to-the-ground capacitor having an electrode provided at a location adjacent to the sheet coil on the surface of the vehicle and having a to-the-ground capacitance thereof changeable by approach of a pedestrian as the approaching object to the vicinity of the vehicle, wherein the discriminator determines whether the approaching object is a metallic body or a pedestrian based on an electrical quantity related to a change in the coil impedance and an electrical quantity related to a change in the to-the-ground capacitance.

39. A detection apparatus for detecting an approaching object, comprising:

a coil provided on a surface of a vehicle and having a coil impedance changeable by approach of a metallic body as an approaching object to the vicinity of the vehicle;

an alternating current power supply for supplying power to the coil; and a discriminator for recognizing approach of the metallic body based on an electrical quantity related to a change in the coil impedance, wherein the coil is an approximately rectangular flat sheet coil having a coil central axis set in an approximately horizontal direction and in a direction approximately perpendicular to a coil-setting portion of the vehicle as well as a long side laid about horizontally on a front or rear face of the vehicle in the transversal direction of the vehicle or provided about horizontally on any of the side faces of the vehicle in the longitudinal direction of the vehicle;

each sheet coil is arranged at a plurality of mutually close or adjacent locations on the front or rear face of the vehicle in the transversal direction of the vehicle or any of the side faces of the vehicle in the longitudinal direction of the vehicle;

the discriminator detects the electrical quantity related to the change in the coil impedance or the electrical quantity related to the change in the to-the-ground capacitance for each sheet coil; and the discriminator carries out a determination process by using a threshold value for the electrical quantity of a center sheet coil selected among the mutually close and adjacent sheet coils arranged in the transversal or longitudinal direction of the vehicle and another threshold value for the electrical quantity of an edge sheet coil selected among the adjacent sheet coils.

* * * * *